May 2, 1944. G. B. SAYRE 2,347,971
APPARATUS FOR MEASURING, PREFORMING AND MOLDING PLASTICS
Filed May 10, 1939 9 Sheets-Sheet 4

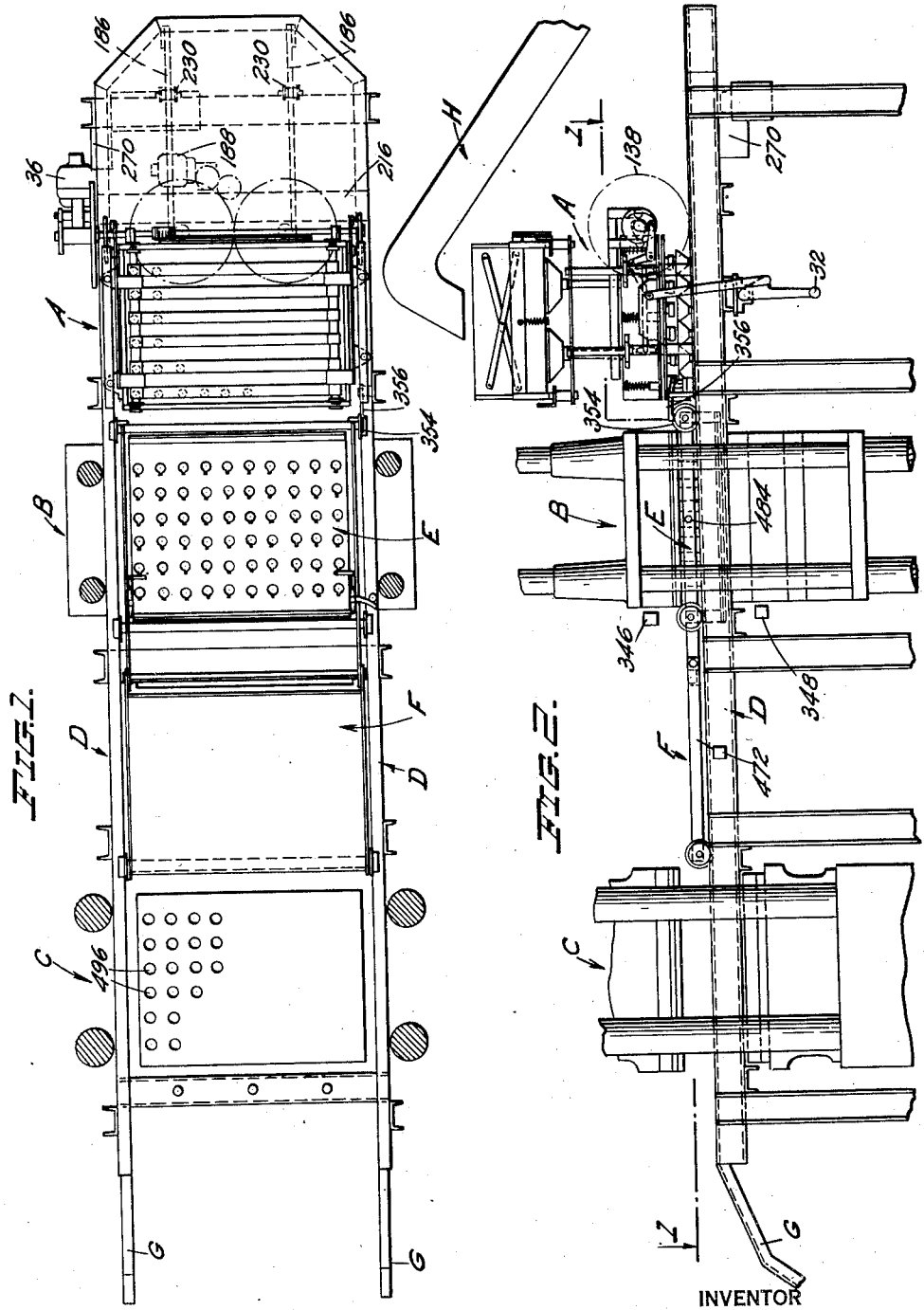

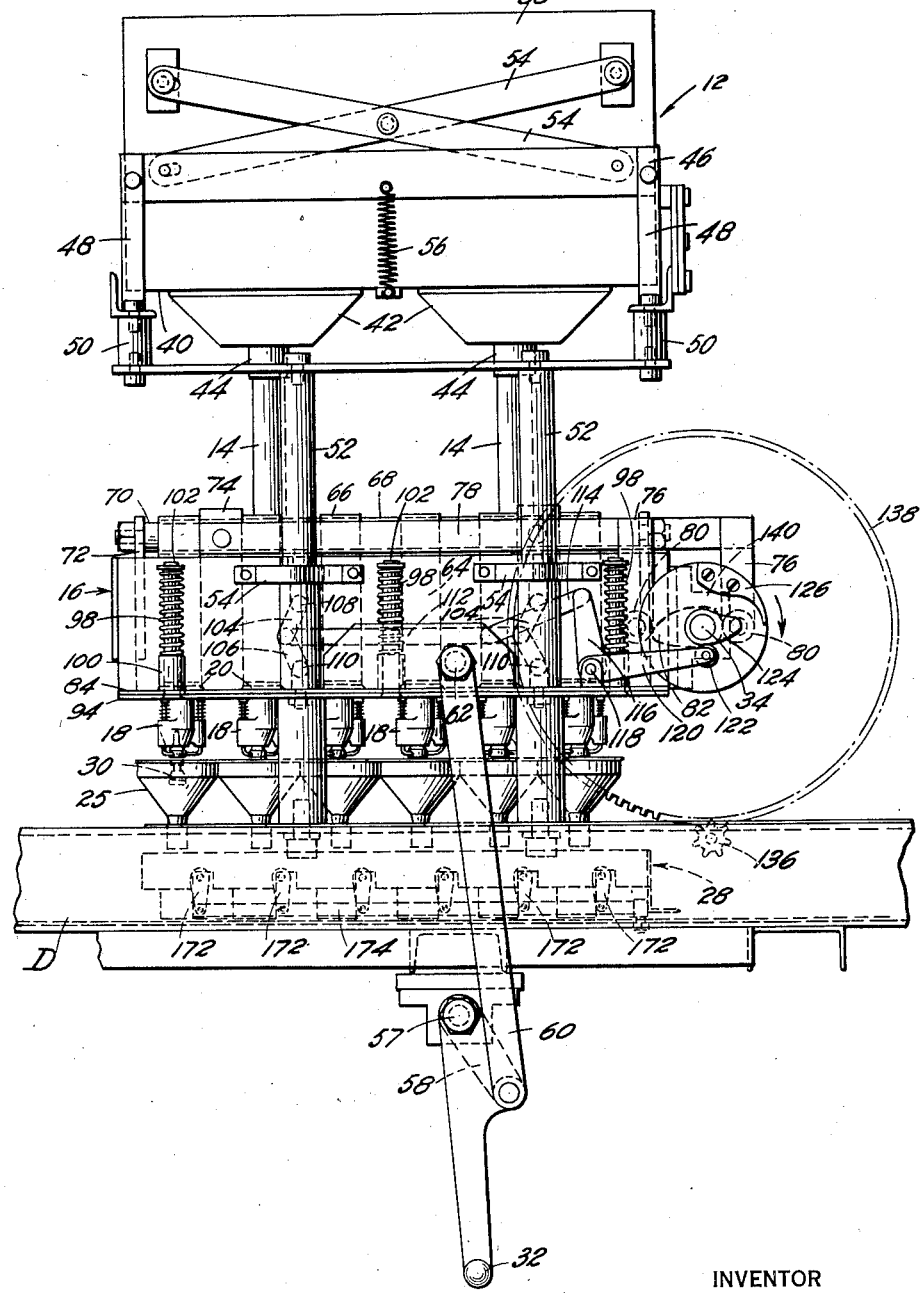

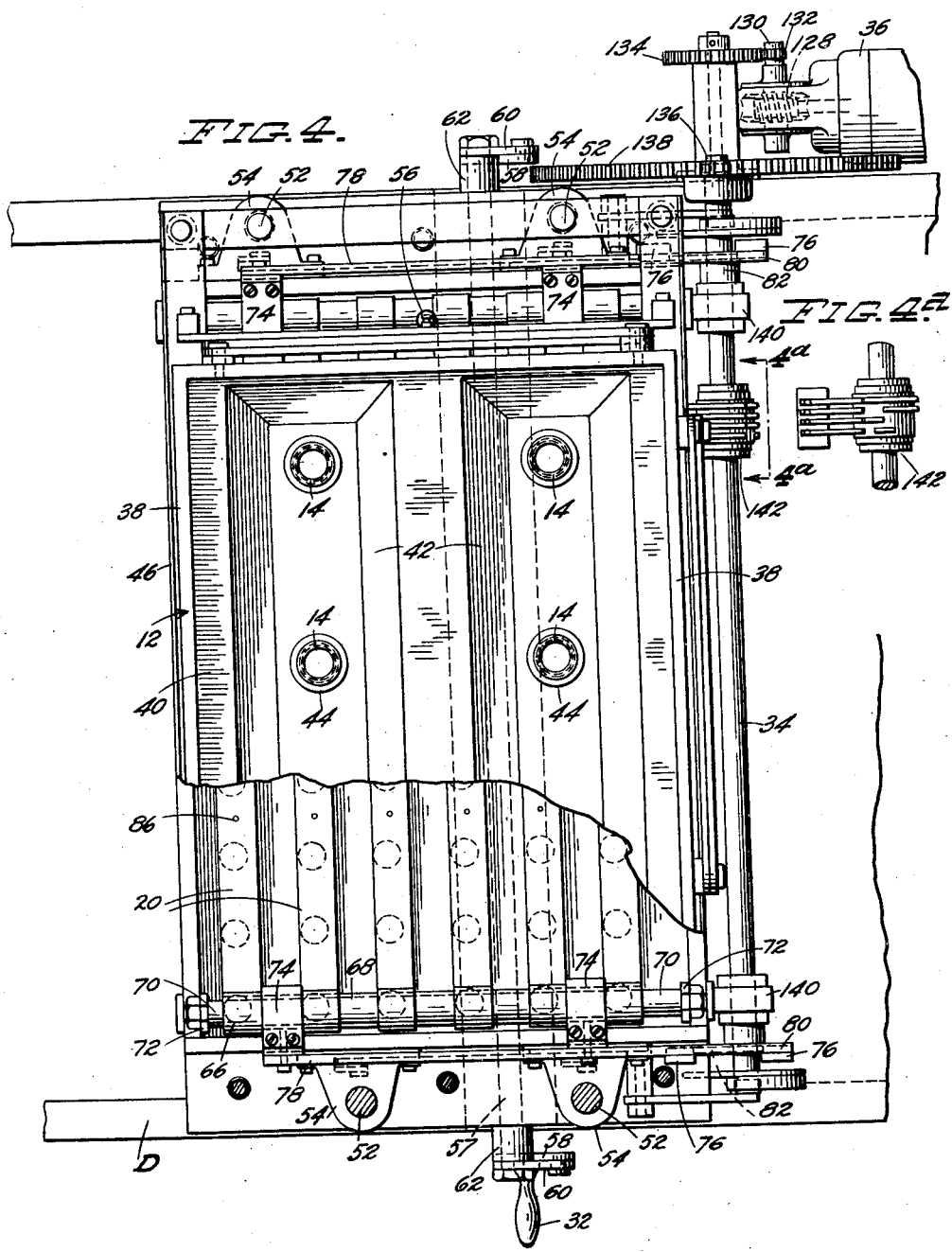

INVENTOR
GORDON B. SAYRE
BY
ATTORNEY

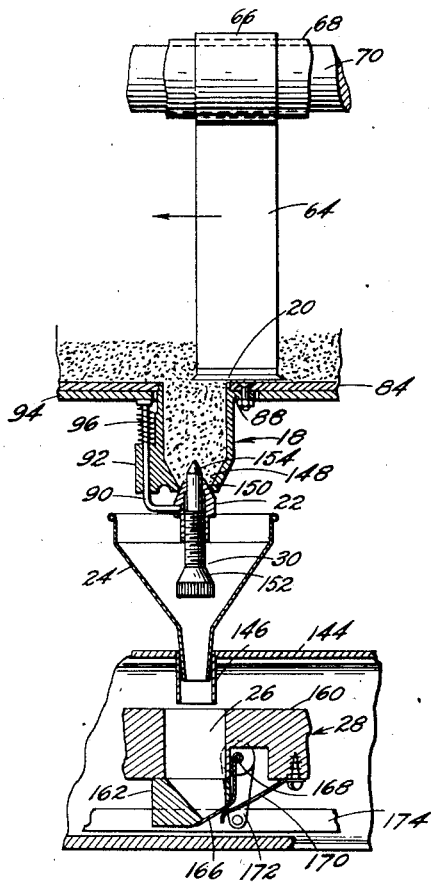
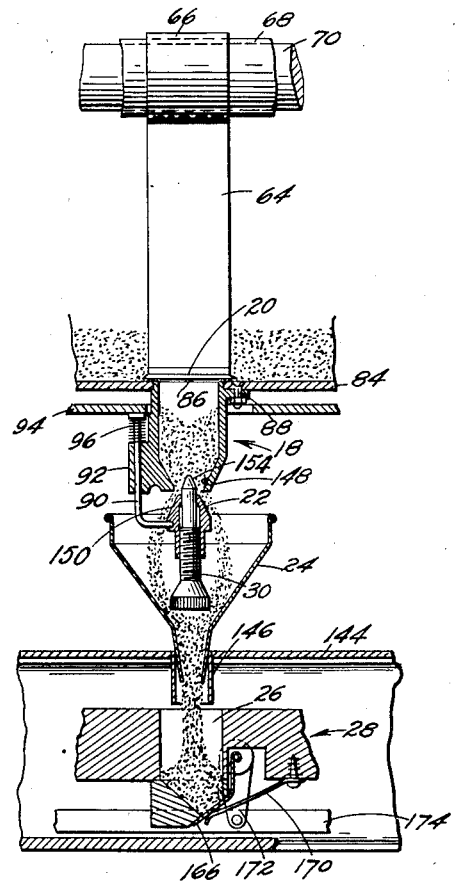
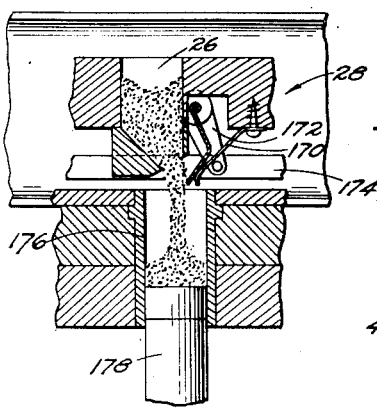
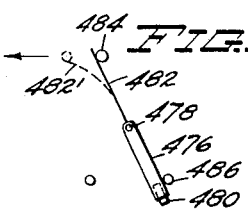
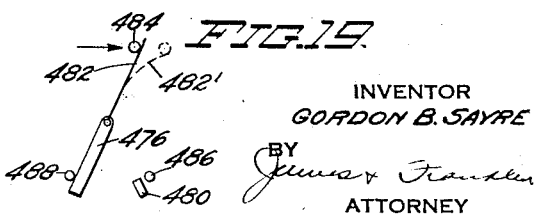
INVENTOR
GORDON B. SAYRE

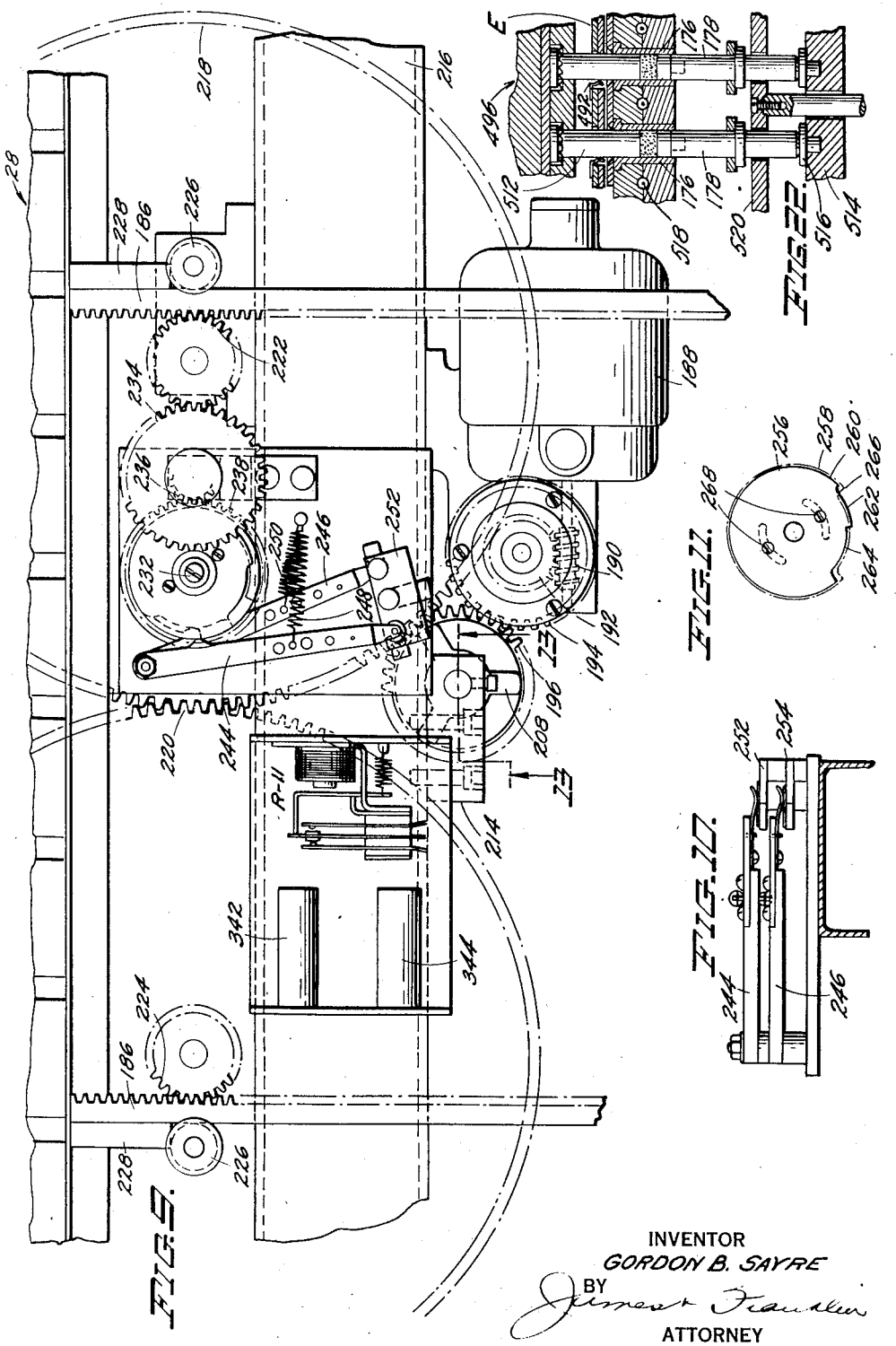

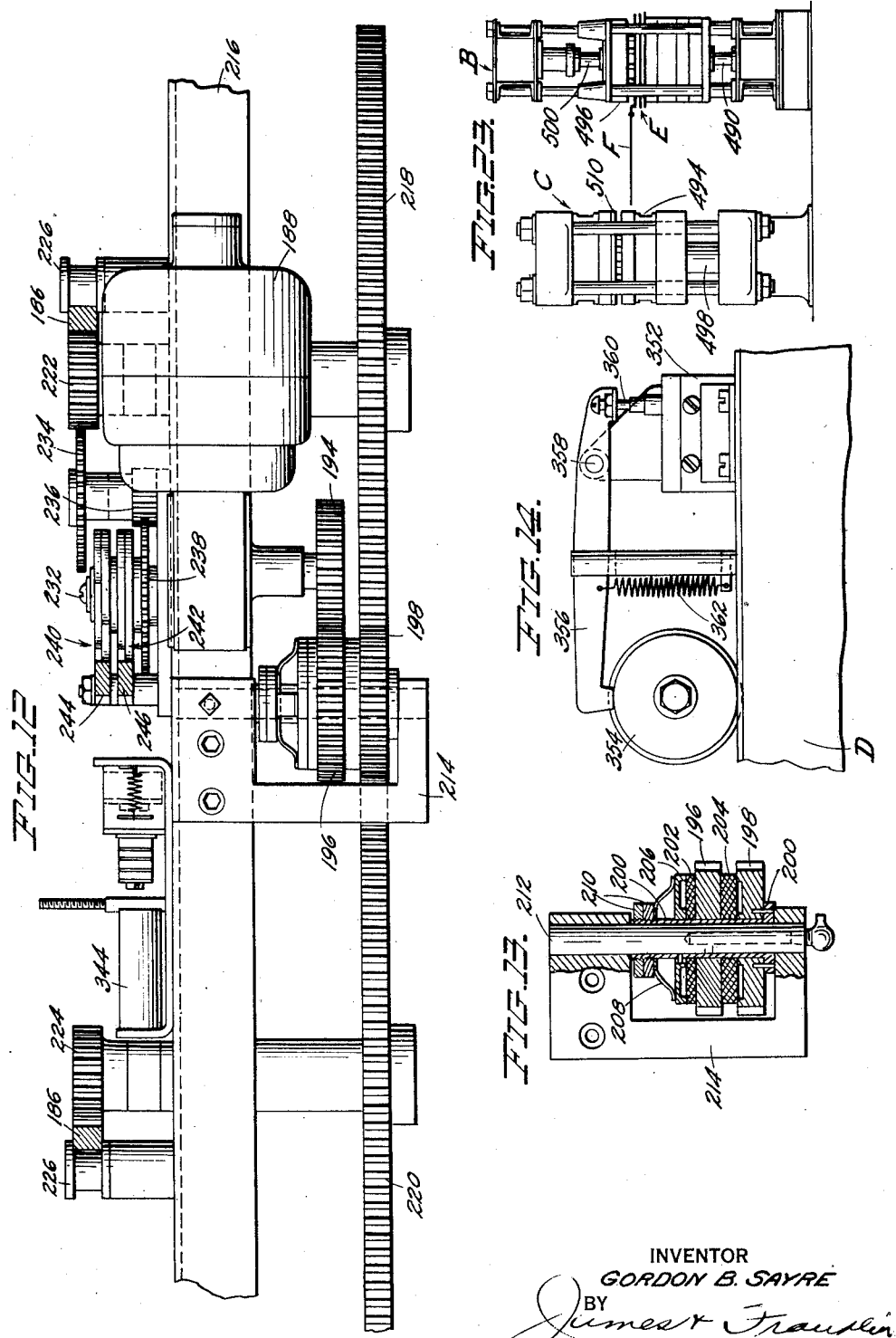

May 2, 1944.    G. B. SAYRE    2,347,971
APPARATUS FOR MEASURING, PREFORMING AND MOLDING PLASTICS
Filed May 10, 1939    9 Sheets-Sheet 8
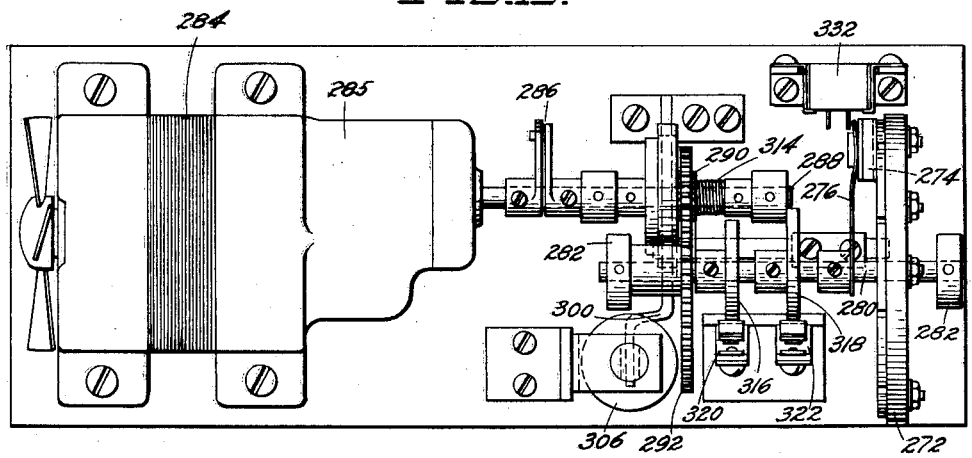
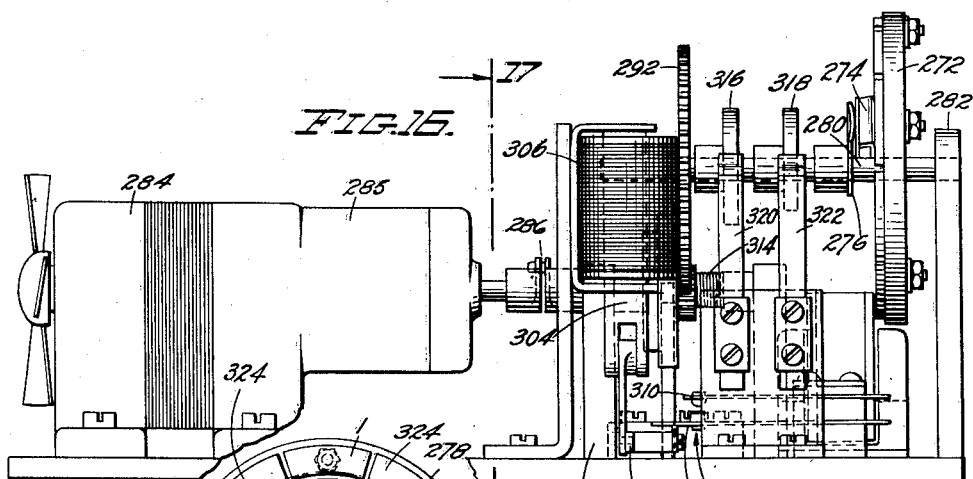
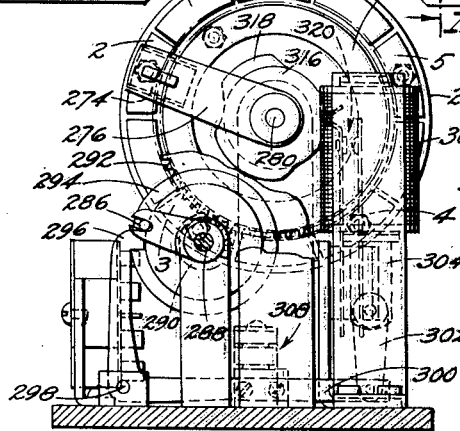
INVENTOR
*GORDON B. SAYRE*
BY
*James Franklin*
ATTORNEY

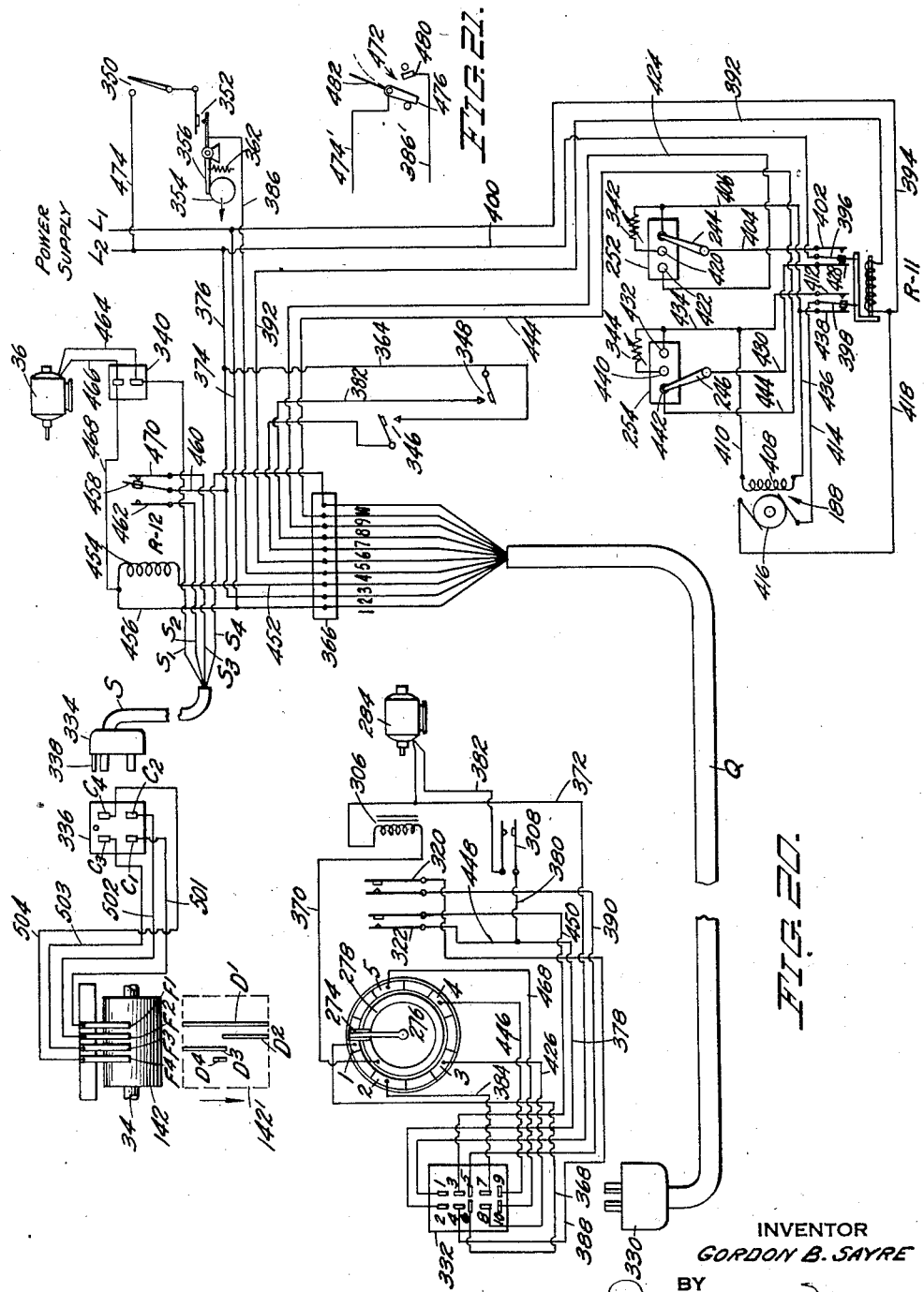

Patented May 2, 1944

2,347,971

UNITED STATES PATENT OFFICE 2,347,971

APPARATUS FOR MEASURING, PREFORM- ING, AND MOLDING PLASTICS

Gordon B. Sayre, Boonton, N. J., assignor to Boonton Molding Company, Boonton, N. J., a corporation of New Jersey Application May 10, 1939, Serial No. 272,769

36 Claims. (Cl. 18—5)

This invention relates to molding, especially of plastics, and more particularly to apparatus for measuring, preforming and molding plastics.

The primary object of my invention is to generally improve molding apparatus of the character specified.

In my prior application, Serial No. 247,017, filed December 21, 1938, and entitled "Molding," I disclose a multiple pill press arranged in combination with a molding press to preform quantities of plastic into pills for bodily transfer of the pills to the molding press. A more particular object of my present invention is to improve the aforesaid apparatus by the provision of a special powder measurer for measuring out the quantity of molding powder supplied to each cavity of the pill press, and for thereby eliminating the need for precise adjustment of the relative elevations of the ejector plugs in the pill press, except for extreme differences in pill size. Moreover, by independent measurement of the powder, the ejector plugs may be low enough to keep the powder level in the pill press well below the top of the pill cavity so that the plunger or force plug moves part-way into the cavity before beginning to compress the powder.

Ancillary objects are to provide such a powder measurer which is wholly automatic in operation; which affords independent adjustment of the individual units of powder being measured, so that the relative quantities of material used in the different pills may be regulated in accordance with the needs of the mold cavities; which is devoid of surfaces which are rubbed together in the presence of molding powder, thereby avoiding possible reaction and curing or setting of the plastic; and the surfaces of which are steeper than the angle of repose of the molding powder, thus insuring discharge of the full measured quantity of powder.

A further object of my invention is to provide a satisfactory powder carrier for transferring the measured quantities of powder from the powder measurer to the pill press. Related objects are to provide the powder carrier with surfaces steeper than the angle of repose of the powder, thus insuring discharge of all of the powder; to provide the powder carrier with mechanism for simultaneously discharging all of the powder into the appropriate pill cavities when the powder carrier is moved into the pill press; to provide appropriate and preferably automatically operated means for moving the powder carrier between the powder measurer and the pill press; and to provide means for decelerating the powder carrier as it nears the end of its motion, in order to prevent shock and possible overthrow of the powder being delivered to the pill cavities.

Still another object of the present invention is to combine the aforesaid powder measurer and powder carrier with a pill press and molding press, the parts being interconnected by appropriate rails or guides which carry not only the powder carrier, but also a suitable pill board which moves between the pill press and molding press. In accordance with further objects of the invention, the parts of the combined apparatus are interlocked for safety, it being impossible, for example, for a second charge of molding powder to be delivered to the pill press until after the first charge has been preformed into pills, and the said pills ejected into the pill board and moved out of the pill press. This prevents the possibility of double-sized pills with consequent ruin of the mold in the molding press.

In fact, in accordance with a further feature and object of the present invention, the powder measuring apparatus is provided with a special sequence relay which responds to each progressive step in the operation of the apparatus, and which prevents any succeeding step from taking place until after the preceding step has been completed, these steps being the closing of the pill press to form pills; the ejection of the pills into the pill board; the movement of the pill board out of the pill press; the movement of the powder carrier into the pill press; the return movements of the powder carrier and the pill board; and the measuring and delivery to the powder carrier of a new supply of powder. The molding press cycle is relatively independent, however, and may continue through to completion, despite any interruption in the foregoing steps, thereby guarding against excessive curing and possible spoiling of the mold.

To the accomplishment of the foregoing, and such other objects as will hereinafter appear, my invention consists in the powder measuring, preforming and molding elements and their relation one to the other as hereinafter are more particularly described in the specification and sought to be defined in the claims.

The specification is accompanied by drawings in which:

Fig. 1 is a horizontal section taken approximately in the plane of the line 1—1 of Fig. 2, and shows the assembly of powder measuring, preforming and molding apparatus;

Fig. 2 is a side elevation of the same with the pill press and molding press only partially shown;

Fig. 3 is a side elevation of the powder measuring apparatus;

Fig. 4 is a partially sectional plan view of the powder measuring apparatus;

Fig. 4a is an elevation of a drum switch looking in the direction of the arrows 4a—4a of Fig. 4;

Fig. 6 is a section taken in elevation through a portion of the powder measuring apparatus and is explanatory of the same;

Fig. 7 is a similar view taken during discharge of the measured powder into the powder carrier;

Fig. 8 is a similar section showing discharge of the powder from the powder carrier into a pill press cavity;

Fig. 9 is a plan view of the mechanism for moving the powder carrier between the powder measurer and the pill press;

Fig. 10 is a side elevation of the limit switches shown in Fig. 9;

Fig. 11 is a schematic diagram explanatory of the cams which operate the limit switches;

Fig. 12 shows the mechanism of Fig. 9 in elevation;

Fig. 13 is a section through a pinion shaft and slip clutch, and is taken in the plane of the line 13—13 of Fig. 9;

Fig. 14 is a side elevation showing a rail switch associated with the pill board;

Fig. 15 is a plan view of the sequence relay;

Fig. 16 is a side elevation of the same;

Fig. 17 is an end elevation of the same taken in the plane of the line 17—17 of Fig. 16;

Fig. 18 is a schematic view explanatory of a modified rail switch operated by the pill board;

Fig. 19 shows the same in its opposite position;

Fig. 20 is a wiring diagram for the apparatus;

Fig. 21 is a detail showing the substitution of the modified rail switch in the circuit;

Fig. 22 is a section explanatory of the construction and operation of the pill press; and Fig. 23 is a schematic elevation explanatory of the relation between the pill press and molding press.

Figure 5:
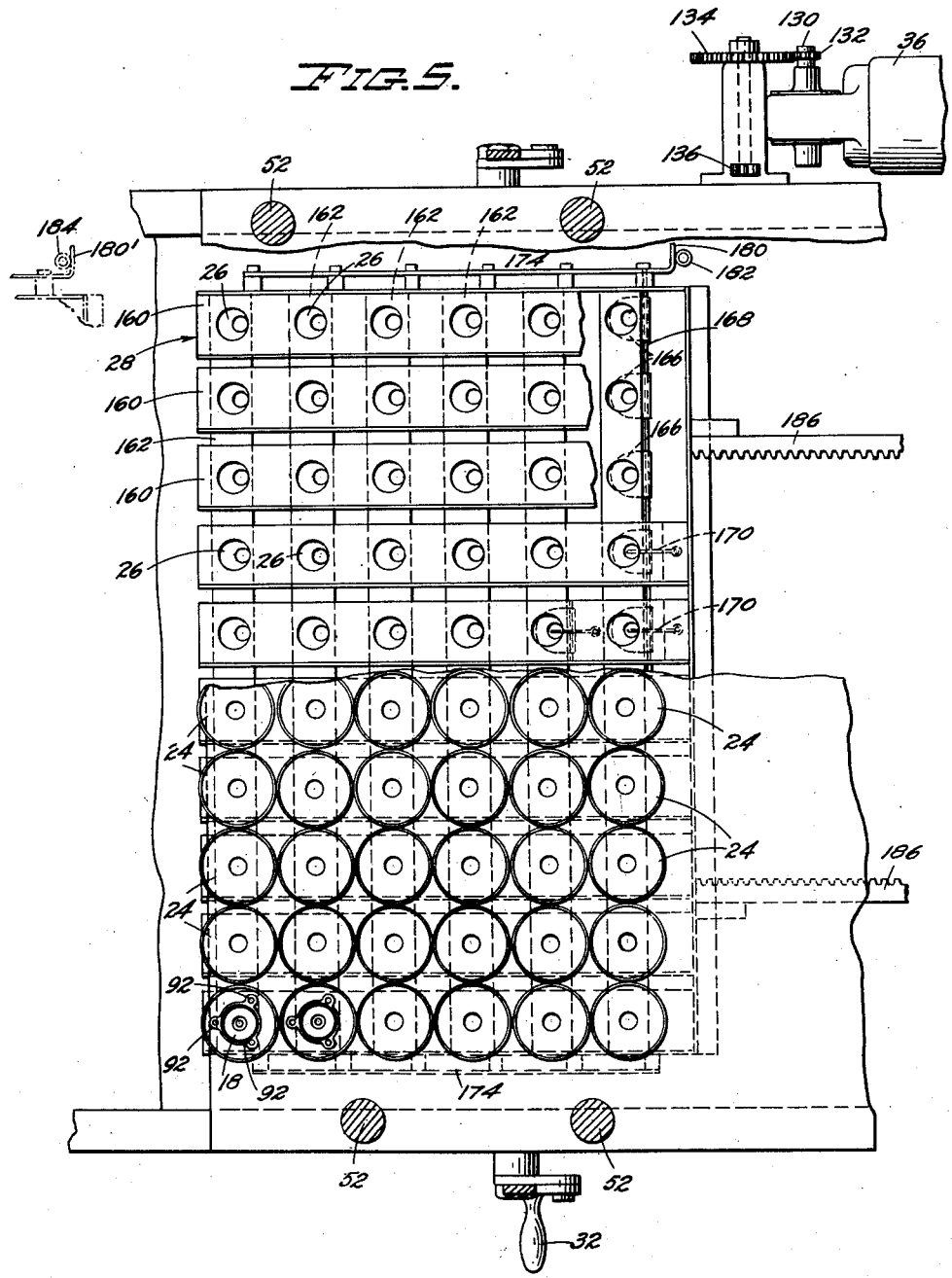
Fig. 5 is a horizontal section taken through the powder measuring apparatus, the lower portion being taken above the funnels, and the upper portion above the powder carrier.

Referring to the drawings, and more particularly to Figs. 1 and 2, the complete apparatus comprises a powder measurer generally designated A, a preforming press, or pill press generally designated B, and a molding press generally designated C. These are connected by rails or guides D which carry a pill board E for transferring the preforms or pills from pill press B to molding press C. If desired, a catch board F may be associated with pill board E in a manner described in greater detail in my co-pending application, Serial No. 239,934, filed November 12, 1938, and entitled "Mechanism for loading and emptying molding presses," said catch board F functioning to receive the finished molded pieces from the molding press, and to discharge the same at the tilted remote ends G of rails D. The rails D also function to guide a powder carrier for movement between powder measurer A and pill press B. The powder carrier is not visible in Figs. 1 and 2, but will be described in detail later.

Molding powder is supplied as needed to the powder measurer A by means of a suitable conveyor H (Fig. 2). A plurality of units or quantities of molding powder are simultaneously measured and then discharged into a mating plurality of pockets in the powder carrier. The powder carrier is then moved from the powder measurer to the pill press where the measured quantities of powder are discharged into appropriate mating pill cavities. The powder is compressed by the pill press to form preforms or pills which are then ejected into the pill board E. The pill board is moved from the pill press B to the molding press C where the pills are dropped into mating mold cavities. Inasmuch as the amount of powder in the individual units, or charges of powder may be relatively varied, or regulated, the pills may be adjusted to optimum dimension for each mold cavity.

In the particular case here illustrated, the apparatus is designed for the molding of bottle caps, and there are as many mold cavities as there are pill cavities, the pills being simple, cylindrical or biscuit-like elements.

It will be understood, however, as is explained in greater detail in my co-pending application, Serial No. 239,934, previously referred to, that a plurality of pills may be deposited in the different parts of a larger cavity in the mold, the pills being appropriately shaped, dimensioned and positioned to best fill the mold cavity.

It will be understood that when a catch board F is provided, as here shown, the movement of the pill board E from the pill press to the molding press takes place in two stages; the first stage bringing the catch board into the pill press to receive the previously molded finished pieces as they are stripped from the mold during opening of the molding press; and the second stage bringing the pill board into the molding press while the catch board moves beyond the molding press and discharges the molded pieces.

In Fig. 23 the rails are omitted, and both presses are shown closed. When the presses open, the movable lower platen 494 of press "C" descends, and the movable upper platen 496 of press "B" rises. Platen 494 is controlled by ram 498, and platen 496 by ram 500. As platen 496 rises, ejector plugs moved by ejector cylinder 490 also rise and eject the pills into pill board "E." The assembly of catch board "F" and pill board "E" moves to the left, the catch board moving into press "C," and the pill board moving to the position between the presses. Press "C" then opens further, and enough to cause stripper plate 510 to strip the molded pieces from the molding pins or cores onto the catch board "F." The boards "F" and "E" then move further to the left, bringing board "F" beyond press "C" where the finished pieces are dumped, and bringing board "E" into press "C," where the pills are discharged into the respective mold cavities. In the meantime the powder carrier moves into the open press "B," discharges the load of molding powder, and returns back to the powder measurer.

The boards F and E return to the position shown in Fig. 23, whereupon the presses are again operated. The force plugs of press B pass through the pill board E during the pill molding operation. This will be clear from inspection of Fig. 22, in which force plugs 512, mounted on top platen 496, are shown passing through the apertures of pill board E, the molding powder being compressed between force plugs 512 and ejector plugs 178. The reaction of ejector plugs 178 is taken by stationary plate 514. Simple inserts or buttons 516 may be used between plugs 178 and plate 514, no screw adjustment such as is shown in application, Serial No. 247,017, being needed. Heat is supplied not only to the molding press but also to the pill press, the pill cavities 176 being heated by Calrod heating elements 518.

Subsequent upward movement of ejector plugs 178 raises the pills in to the apertures of pill board E, where the pills are held by springs 492. The ejector plugs are raised by ejector plate 520.

The pill press need not be described in detail, it being the same as that shown in my application, Serial No. 247,017, except for the omission of screw adjustments at 516. The other or added new apparatus is described in detail hereinafter.

*The powder measurer*

The powder measurer may be described in greater detail with reference to Figs. 3 through 7, of the drawings. Referring to Fig. 3, it comprises a hopper 12 from which the molding powder is fed by means of discharge pipes 14 to a powder box 16. A series of powder measuring chambers 18, which, for convenience, are hereinafter referred to as "cups," are disposed at the bottom of powder box 16. The supply of powder to powder cups 18 may be cut off at the top by suitable cut off plates, or slide plates 20 as is best shown in Figs. 4, 6 and 7. The discharge of powder from each of powder cups 18 is controlled by a suitable closure or valve 22 at the bottom thereof, and the discharged powder is received in a subjacent funnel 24. The powder is guided by funnel 24 into a mating chamber 26, hereinafter for convenience called a "pocket," of the powder carrier 28.

The amount of powder measured in measuring cup 18 may be adjusted by means of a suitable regulator screw 30 projecting into the measuring cup. It is convenient to locate the regulator 30 in valve 22, as is best shown in Figs. 6 and 7, but for access to the regulators 30, it is then necessary to elevate the powder box 16, in order to bring the regulators out of the funnels 24. This may be done by means of a suitable lift handle 32 (Figs. 3 and 4). The supply pipes 14 are preferably arranged slidably in hopper 12, and are raised with powder box 16 when the latter is elevated by handle 32. The operation of cut off plates 20 and discharge valves 22 is controlled by means of a cam shaft 34 mounted at one side of powder box 16, said shaft being driven through appropriate reduction gearing by means of a motor 36 (Figs. 4 and 5).

Considering the arrangement in greater detail, the hopper 12 is open at the top and comprises side walls 38, and a bottom wall 40, shaped as indicated at 42, to form troughs leading to discharge collars 44, each of which slidably receives one of the supply pipes 14. Pipes 14 are flanged outwardly at their upper ends to limit the descent of the pipes. The lower ends of pipes 14 determine the level to which powder is filled in powder box 16, and this level is, of course, so selected as to prevent overflow of powder from the powder box. The entire hopper 12 is floatingly supported within a frame 46, the corners 48 (Fig. 3) of which are rigidly mounted on members 50, which in turn are supported on stationary pillars or columns 52 projecting upwardly from the guide rails D. The hopper 38 is guided for parallel movement by the crossed arms 54, the lower ends of which are secured to stationary frame 46, and the upper ends of which are secured to hopper 12. The weight of the hopper with its load of powder is taken by tension springs 56, the upper ends of which are secured to frame 46, and the lower ends of which are connected to hopper 12. In this way, the weight of the hopper may be used to control a suitable switch for automatically starting and stopping the motor of conveyor H schematically shown in Fig. 2, thereby maintaining an adequate supply of molding powder in the hopper, in accordance with the rate of use of the powder.

The powder box 16 is vertically slidable on columns 52, it being connected to the columns by appropriate ears 54 (Figs. 3 and 4). Columns 52 are stepped in diameter, the lower, larger diameter portions limiting the downward movement of powder box 16. Upward movement is provided by means of the lift handle 32 previously referred to, this handle being secured to a rod 57 extending from one side of the machine to the other, and said rod 57 having arms 58 connected to links 60 extending upwardly to the powder box at 62. It will be evident from inspection of Fig. 3, that when handle 32 is swung from the downward position shown to an upward position, the powder box is elevated, thereby lifting the regulator screws 30 well out of the funnels 24.

The cut off plates, or slide plates 20 are secured at their ends to vertical straps 64 (Fig. 6) the upper ends 66 of which are turned about and fixedly secured to a tube, or sleeve 68, which in turn is slidable on a guide rod 70. The ends of rod 70 are secured to upright straps 72 (Figs. 3 and 4) projecting upwardly from powder box 16. Sleeve 68 is arranged to be reciprocated by cam shaft 34 in the following manner. Blocks 74 are secured to sleeve 68 and are connected to one another and to cam followers 76 by means of straps 78. Cam followers 76 are provided at their lower ends with cam follower rollers 80 which in turn cooperate with a rapid motion cam 82 (Figs. 3 and 4). There are duplicate cam follower rollers 80 on opposite sides of cam 82 in order to provide for positive motion in both directions. The cam and cam follower mechanism is duplicated at opposite ends of cam shaft 34, in order to provide parallel motion for the slide plates 20.

Referring now to Figs. 6 and 7, it may be pointed out that slide plates 20 are elevated somewhat above the bottom 84 of the powder box. This elevation may be a matter of, say, only $\frac{1}{32}$ of an inch, but it is very important in order to avoid sliding surfaces exposed to the molding powder, for I have found that there is a tendency for the molding powder to begin to react or cure when subjected to friction between sliding surfaces. This difficulty is cumulative and may soon bind the sliding surfaces. The difficulty is avoided, however, by elevating the cut off plate 20 slightly above bottom 84, as shown in the drawings. The cut off plate is made wider than the diameter of measuring cup 18. This more than adequately cuts off further flow of powder into the measuring cup when valve 22 is open, as shown in Fig. 7. It is true that a slight rim of powder will be discharged into the measuring cup, this rim, however, being very small and limited by the natural angle of repose of the powder, which I find is substantially 45°.

By considerable precision in workmanship, the cut off plates 20 may be maintained slightly above bottom 84 while supporting the plates solely at the ends, but I find that it is far cheaper and entirely satisfactory to provide the cut off plates with a few pins 86 (Figs. 4 and 7), which project downwardly by an amount equal to the desired spacing, say, 3/32 of an inch. Although these pins slide on the bottom of the powder box, they are so tiny in area that no difficulty is encountered therefrom. The leading and trailing edges of the cut off plates 20 are preferably tapered, as is clearly shown in Figs. 6 and 7, so that the cut off plates may be moved through the powder with minimum disturbance.

The measuring cups 18 are secured to the bottom 84 of the powder box by means of ears 88 (Figs. 6 and 7), there being three such ears. The discharge valve 22 is supported on three slender guide pins 90, these being slidably received in bearings 92 (Figs. 5 and 6) cast integrally with cups 18. The bearings 92 are staggered relative to ears 88. The upper ends of pins 90 rest beneath an operating plate 94. Pins 90 and valve 22 are normally elevated by means of light springs 96 coiled about pins 90. However, when operating plate 94 is depressed from the position shown in Fig. 6 to that shown in Fig. 7, the pins 90, and with them the valve 22 are depressed, thus opening the measuring cup 18 to discharge the contents thereof.

Now referring to Fig. 3, the operating plate 94 is normally held upwardly against the bottom 84 of the powder box by means of compression springs 98, the lower ends of which rest on bearings 100 secured to bottom 84, and the upper ends of which bear against rods 102, which pass downwardly through springs 98 and bearings 100 to the valve operating plate 94. Springs 98 make it possible to use a comparatively heavy, rigid operating plate while retaining thin, light springs 96 at the individual valves.

Operating plate 94 is moved downwardly by toggle mechanism including upper arms 104 and lower arms 106, the upper arms being pivoted on the powder box at 108, and the lower arms being pivoted on the operating plate 94 at 110. Arms 104 and 106 are connected together and to a link 112. Link 112 is in turn connected to a link 114, the outer end of which is connected to an arm 116 mounted on rod 118, which in turn carries cam follower arm 120, the outer end of which is provided with a cam follower roller 122. This is moved by a cam mounted on cam shaft 34, said cam including an inner portion 124, and an outer portion 126, in order to provide positive motion in both directions. It will be understood that this entire toggle and cam mechanism is duplicated on both sides of the machine in order to provide parallel motion of operating plate 94.

Cam shaft 34 is driven by motor 36, best shown in Fig. 4, through appropriate reduction gearing. Specifically, motor 36 drives a worm 128 which meshes with a worm gear mounted on shaft 130. This in turn drives pinion 132 meshing with gear 134, which in turn drives a pinion 136 (Figs. 3, 4 and 5). The latter meshes with large gear 138 mounted directly on cam shaft 34. Cam shaft 34 is carried in bearings 140, which in turn are mounted directly on the side wall of powder box 16. When the powder box is elevated by means of lift handle 32, the cam shaft and gear 138 are elevated, the latter separating temporarily from pinion 136.

Cam shaft 34 carries a switch drum 142 (Fig. 4), the contact segments of which are connected into the motor circuit as is later described in greater detail. For the present, it may be briefly pointed out that switch drum 142 functions to stop motor 36 after cam shaft 34 has turned through a half revolution. In other words, the cam shaft 34 is a half revolution shaft, and in one dwell position the cut off plates 20 are closed and discharge valves 22 are open, while in the opposite dwell position the valves 22 are closed and the cut off plates 20 are open. The cams on cam shaft 34 are quick action cams, and there is accordingly considerable overlap between the closing of the top valve and the opening of the bottom valve and vice versa, thus guarding against any possibility of both valves being open at one time.

Reverting now to Figs. 6 and 7, the funnels 24 are supported by a suitable funnel plate 144. The latter may, if desired, be provided with a series of tubes 146, the latter functioning to improve the support of the funnels and to guide the discharged powder downwardly to a point immediately above the powder carrier 28. The upper rims of the funnels may, if desired, be so dimensioned as to come into contact, substantially as indicated in Fig. 5, in which case the funnels may be bound together at the points of tangency, thereby additionally supporting the funnels against relative movement.

In connection with the powder measuring cups, attention is directed to the fact that the arrangement is substantially devoid of flat surfaces. The surfaces are either vertical, or are disposed at an angle steeper than the angle of repose of the powder. In the present case, the angle is steeper than forty-five degrees. This applies to the bottom wall 148 of the measuring cup, and also to the top wall 150 of valve 22, as well as the top wall 152 of the handle of regulator screw 20, and also the upper end 154 of the regulator screw. Similarly, the surfaces of funnel 24 are either vertical, or disposed at an angle steeper than forty-five degrees. This insures complete discharge of the measured charge of powder upon opening of the discharge valve 22.

The adjusting screws 30 are intended only for fine changes in measurement. For coarse changes in measurement, sleeves are inserted in the measuring chambers, thereby reducing the capacity of the same. For example, in a specific case dealing with the molding of bottle caps, the measuring cups have a capacity of about ten grams. The range of adjustment provided by the adjusting screw is a matter of only one-half of a gram. However, bottle caps using only, say, four grams of material, are readily made by inserting sleeves of appropriate size in the measuring cups. The needed accuracy of measurement will be understood if it is mentioned that an error equivalent to only a fraction of a turn of the adjustment screw is enough to produce a flash extending around one bottle cap all the way to the edge of the cavity insert.

With some molding materials which tend to cling to the walls of the measuring cup, I find it desirable to add means to vibrate the entire assembly of cups. A small electric vibrator may be used. These were mounted to vibrate the plate carrying the cups. They need not vibrate continuously, and instead may be connected in circuit to vibrate whenever the cups are discharging.

The powder carrier

Referring first to Fig. 5, the powder carrier 28 is built up of a series of parallel members 160 overlying another series of parallel members 162, the latter being disposed transversely of the former. The powder carrying chambers or pockets 26 are formed in these members.

Referring now to Figs. 6 through 8, it will be seen that the bottom of pocket 26 is closed by a suitable door, or valve 166. In the specific arrangement here shown, this valve is in the form of a vane, and it is so designated hereinafter for convenience, and in order to distinguish the same from the cut off valve or plate at the top of the measuring cup, and the discharge valve at the bottom of the measuring cup. It will be understood that other types of valve than a vane may be used on pocket 26. Vane 166 extends upwardly to and is secured on a spindle 168. The vane is normally closed by a wire spring 170. The vane may be opened against spring 170 by oscillation of spindle 168, this being caused by arm 172, which in turn is moved by link 174. Before leaving this part of the drawings, it may be pointed out that the powder carrier, like the powder measurer, has either vertical surfaces, or sloping surfaces which are steeper than the angle of repose of the powder, thereby insuring complete emptying of the powder pocket when vane 166 is opened.

The vanes are all simultaneously opened when the powder carrier has been moved into the pill press and is disposed in proper registration with the pill cavities, as is indicated for one cavity in Fig. 8, the pill cavity being shown at 176, and the ejector plug forming the bottom of the pill cavity being shown at 178. The pill press is not shown in detail, it being constructed as in my application Serial No. 247,017, except that the screw adjustment at the bottom of each ejector plug is unnecessary.

Referring now to Fig. 3, the manner in which the arms 172 for each of the rows of vanes on powder carrier 28 are connected together by link 174 is clearly shown. It may be mentioned that this linkage is repeated at opposite sides of the powder carrier, as will be seen by reference to the links 174 in Fig. 5. The connection of some of the vanes 166 to spindle 168 is also shown in Fig. 5, as well as the location of some of the vane closing springs 170. The end of link 174 is bent sidewardly at 180 to form means cooperating with stationary stops 182 and 184. The stop 184 is the more important, it being located at the pill press and functioning to open all of the vanes when the powder carrier is moved fully into the pill press, so that it is in registration with the pill cavities. The stop 182 is located in the powder measurer and functions to insure closing of the vanes when the powder carrier is moved back into the powder measurer with its pockets in registration with the funnels. Ordinarily, the vane closing springs 170 are adequate for this purpose.

The powder carrier is preferably moved by means independent of the pill board, for the cycle of movement of one differs somewhat from the other. In the present case, the powder carrier is moved by gear and rack mechanism under propulsion of a separate motor of the reversing type. The racks connected to the powder carrier are shown at 186 in Fig. 5. The mechanism for driving the same may be described with reference to Figs. 9, 12 and 13 of the drawings.

Referring to those figures, the motor 188 drives a worm 190 meshing with a worm gear 192, the depending shaft of which carries a gear 194 meshing with a gear 196. The latter drives a subjacent pinion 198 through a suitable friction clutch mechanism. This is best shown in Fig. 13, in which it will be seen that pinion 198 is secured to sleeve 200, which in turn rotatably carries gear 196, the latter being located between friction discs 202 and 204. The parts are axially compressed together by means of a flange plate 206 keyed to sleeve 200 and urged downwardly by means of the bent arms of spring plate 208. The force of spring 208 may be regulated by means of lock nuts 210 threadedly received on sleeve 200. The entire sleeve 200 is, of course, freely rotatable on a pin 212, the latter being supported in a suitable bearing yoke 214. This in turn is secured to a cross frame member 216 (Figs. 9 and 12) extending from one rail to the other on opposite sides of the apparatus, as is indicated in Fig. 1.

Pinion 198 meshes with a large gear 218, and this in turn meshes with a similar large gear 220. Gear 218 turns a pinion 222, which in turn meshes with one of the racks 186. Gear 220 turns a pinion 224, which in turn meshes with the other rack 186. The racks are supported in mesh with pinions 222—224 by guide rollers 26. In Fig. 9 the powder carrier 28 is shown in its retracted position, and at this time the blocks 228 abut the rollers 226, thus acting as motion limiting stops. The disposition of the racks 186, as well as the provision of additional guide rollers 230 will be clear from inspection of Fig. 1 of the drawings.

The powder carrier is moved forwardly by energizing motor 188 for rotation in one direction, and is moved back by energizing the motor for rotation in the opposite direction. The motor is stopped at the end of the forward or rearward movement of the powder carrier by appropriate motion limit switches. These are also arranged to act as decelerating switches to slow down the motor speed as the powder carrier approaches the end of its travel. The motion limit switches may be described with reference to Figs. 9 through 12 of the drawings. Pinion 222 drives a cam shaft 232 through appropriate reduction gearing so selected that the cam shaft turns substantially less than one revolution during the complete forward or backward movement of the powder carrier. Specifically, pinion 222 meshes with the gear 234, which in turn drives a pinion 236 meshing with a gear 238 mounted on cam shaft 232.

The cam shaft 232 carries upper and lower cam assemblies 240 and 242 (Fig. 12). The upper cam 240 operates an upper switch arm 244, while the lower cam 242 operates a lower switch arm 246. One of these limits the forward drive of motor 188, and the other the rearward drive. The switch arms are normally moved against the cams by pull springs 248 and 250 (Fig. 9). The ends of the switch arms are movable over a series of three contacts mounted on insulation strips 252 and 254 (Fig. 10).

Each cam assembly is made up of two relatively movable cam discs, and the reason for this may be explained with reference to Fig. 11, in which one of the discs 256 is shown in solid lines, and the other 258 is shown in broken lines. Disc 256 may be considered the main cam disc, and it is cut to three different radii, the largest at 260, the intermediate at 262 and the smallest at 264. When the switch lever bears against the large radius portion 260 of the cam, the motor circuit is closed and the powder carrier is in motion. When the switch arm engages the intermediate radius portion 262 of the cam, it is moved to the center contact, at which time the motor is decelerated to slow speed, as by the insertion of a speed reducing resistor in series with the motor. When the switch arm engages the small radius portion 264 of the cam, the motor circuit is opened. There is adequate room for over travel of the powder carrier after the motor is stopped, the powder carrier then being stopped by appropriate positive abutments, generally like those numbered 228 (Fig. 9), but on the back ends of racks 186, said abutments coming in contact with rollers 226.

It is desirable, though not at all essential, to provide for adjustment of the deceleration of the powder carrier, and this adjustment may be different for the forward movement than for the rearward movement. During the forward movement, the powder carrier is preferably brought to a gradual stop not only to avoid shock, but also to prevent the powder being discharged from the pockets from being thrown forwardly beyond the pill press cavities. During rearward movement of the powder carrier, it is empty and the only requirement is to avoid mechanical shock. The adjustment of deceleration is made in either and preferably both of two ways; first, by adjustment of the magnitude of the inserted resistor, and second by adjustment of the time or point at which the motor is changed from full speed to slow speed operation.

In the present case, this latter adjustment is provided by the extra disc 258, for by relative adjustment of the discs, the location of the point 266, or in other words, the length of the slow speed portion 262 may be varied, thereby changing the duration of the slow speed operation. When the discs 256 and 258 have been adjusted to desired relation, this adjustment may be locked by means of screws 268.

It may be pointed out that it is not essential to use stationary pockets with valves thereinbeneath for the powder carrier, the important thing being the provision of pockets adapted to transfer the powder and to discharge the same at the pill press. For example, I have successfully employed a powder carrier in which no valves are used at all, and instead, the pockets are oscillatably mounted and discharge their contents by being tilted to inverted position.

Sequence relay

In order to appropriately interlock the various parts of the apparatus and to prevent a succeeding step from taking place before completion of a preceding step, the apparatus is preferably provided with appropriate interlocking switches, the main one of which is here called a sequence relay, and is best shown in Figs. 15 through 17. This sequence relay may be located at any convenient point, and in the present case is housed in a small switch box 270 shown in Figs. 1 and 2.

Referring to Figs. 15–17 the sequence relay comprises a series of contacts, in this case located about a stationary insulation disc 272. The contacts are sequentially engaged by a brush, or wiper 274 insulatedly carried at the end of a contact arm 276. A slip ring 278 (Fig. 17) is mounted within the contacts, and is also engaged by the wiper 274. Contact arm 276 is carried on an intermittently moved shaft 280 carried in bearings 282. Shaft 280 is driven by a motor 284 having integrally built reduction gearing at 285, which is coupled at 286 to a pinion shaft 288 carrying a pinion 290 meshing with a gear 292 mounted on shaft 280.

In the present case where the sequence relay is arranged for five step operation and is provided with five main contacts, the gear ratio between pinion 290 and gear 292 is preferably 5 to 1, so that one complete revolution of shaft 288 corresponds to the movement of contact arm 276 from one contact to the next. Shaft 288 carries a notched disc 294 (Fig. 17) controlled by a dog 296. Dog 296 is pivoted at 298 and has a horizontally extending arm 300 connected by a link 302 to the lower end of a solenoid core 304 arranged to be drawn upwardly into solenoid coil 306 when the latter is energized. The dog arm 300 also operates a motor switch 308, the horizontally extending contacts of which are best shown in Fig. 16. The upper contact 310 is stationary, while the lower contact 312 rests on dog arm 300. It will be evident that release of dog 296 by solenoid 306 closes motor switch 308, the latter then remaining closed until the dog returns to locking position, which cannot take place until shaft 288 has completed a full revolution. At the end of a full revolution the dog moves into the notch of disc 286, thereby abruptly stopping the mechanism, and at the same time opening motor switch 308 and de-energizing the motor.

To avoid shock, the connection between shaft 288 and the notched disc 206 preferably takes place through an appropriate friction clutch. More specifically, the disc 286 is fixedly connected to pinion 290, but these elements are rotatable on shaft 288. They are held against rotation by appropriate friction surfaces pressed axially by means of compression spring 314 (Figs. 15 and 16).

For reasons later described in connection with the operation of the apparatus, the shaft 280 is also provided with cams 316 and 318, these respectively operating switches 320 and 322. The switches comprise vertical spring contacts, as is best shown in Fig. 17, the outer contact being a stationary contact, and the inner contact being moved by the cam. The switch 320 may be designated as a powder measuring switch while the switch 322 may be designated as a powder carrier switch. The switch 320 is closed on step or contact No. 5 of the sequence relay, and opens just before the contact arm stops on contact 1. The powder carrier switch 322 is closed on steps or contacts 3 and 4 of the sequence relay.

The contacts 1 through 5 are so designated in Fig. 17. It will be noted that there are additional contacts 324 between the contacts 1 through 5. These are merely insulating contacts intended to prevent the wiper 274 from engaging any two of the live contacts at once, in which case current might be transferred from one contact to the next in such a way as to upset the proper operation of the apparatus.

Circuit wiring and operation

The circuit wiring for the apparatus is set forth in the diagram of Fig. 20. It is convenient to provide for ready disconnection of some parts from other parts of the apparatus, and in Fig. 20, the ten conductors of cable Q lead to a male connector 330 shown in end elevation, this mating with a female connector 332 the ten contact points of which correspond to the ten wires of cable Q. Some of the contact blades of the connector are arranged at right angles to the others, so that the male and female parts can be assembled in only one relation.

Another connector is arranged between the four wire cable S and the drum switch 142. Cable S terminates in a male connector 334 which mates with a female connector 336. The pin 338 insures proper assembly of the male and female connectors. A simple two wire connector is schematically indicated at 340.

The diagram includes three motors. The motor 36 drives the half revolution cam shaft 34 of the powder measurer. This motor is controlled partially by switch drum 142, and its operation is additionally controlled by relay R—12.

The motor 188 moves the powder carrier. It is arranged to act as a reversing motor, it being controlled and reversed by the motor reversing relay R—11. The switch arms 244 and 246 are for decelerating and limiting the motion of the powder carrier. The deceleration is obtained by the insertion of resistors 342 and 344. Relay R—11 and resistors 342 and 344 are located as is indicated in Figs. 9 and 12 of the drawings.

The third motor 284 is the driving motor of the sequence relay. It moves contact 274 to any of the five contacts numbered 1 through 5, all as was previously explained. Solenoid 306 releases the dog 296 (Fig. 17) of the sequence relay and closes the motor switch 308, all as was previously explained.

Attention is directed to the limit switches or contacts 346 and 348. Switch 346 is arranged to be closed by the movable head or platen of the pill press when the pill press is closed. This switch is schematically indicated by the rectangle 346 in Fig. 2 of the drawings. The lower switch 348 is an ejection switch arranged to be closed when the ejector plate of the pill press is raised, thereby ejecting the pills or preforms into the pill board. This switch is schematically indicated by the rectangle 348, in Fig. 2.

Switch 350 at the upper right hand corner of the diagram is a manually operable switch which begins the pill forming and powder measuring cycle. This switch is used when manual control is preferred, but the operation may be automatically controlled, as will be described later in connection with Fig. 21.

Switch 352 is a rail switch which is open when the pill board is in the pill press, but which is closed when the pill board leaves the pill press. The nature of this switch may be better described with reference to Fig. 14, in which a wheel 354 of the pill board is shown resting on rail D. When the pill board is in the pill press, the wheel 354 comes beneath arm 356, pivoted at 358, and connected to switch 352 by means of plunger 360. Arm 356 is normally urged downwardly both gravitationally and by spring 362.

It will be evident that when the pill board leaves the pill press, wheel 354 moves from beneath the end of arm 356, thereby permitting the arm to fall, and thus operating the switch. The location of arm 356 and its relation to wheel 354 of the pill board is shown in Figs. 1 and 2 of the drawings.

Reverting now to Fig. 20, the operation of the apparatus is as follows:

It is most convenient to begin with the closing of the pill press, and it is, therefore, assumed that the pill press has already been charged with molding powder. At this time, the sequence relay arm 276 is in the vertical position shown in the drawing; that is, it rests on contact 1. The operator is provided with suitable controls for the molding press and the pill press, and the manual switch 350 is conveniently located near these controls. For simplicity, a description of the operation of the molding press may be omitted, but in practice the molding press and pill press may even be interlocked for substantially simultaneous operation.

The first step is to close the pill press and to thereby press the powder in the cavities. This closes the upper pill press switch 346, whereupon power is supplied from line 2 (marked L2) of the power supply source through conductors 376, 364 to pill press switch 346 and thence to the terminal strip 366. It then flows through conductor 6 of cable Q to contact 6 on connector 332, which is connected through conductor 368 to No. 1 segment of the sequence relay. Current flows from No. 1 segment through slidable contact 274 to the slip ring or contact ring 278, and thence through conductor 370 to solenoid 306. The current returns from the solenoid through conductor 372 to contact 1 of connector 332, which in turn leads back through wire 1 of cable Q to terminal strip 366, and thence through conductor 374 to line 1 of the power supply. This completed circuit energizes solenoid 306, which releases the dog of the sequence relay, and at the same time closes the motor switch 308. When switch 308 is closed, current flows from power supply line 2 through conductor 376 to terminal strip 366, then through wire 2 of cable Q to contact 2 of connector 332, and thence through conductor 378 and conductor 380 to motor switch 308, which in turn leads through conductor 382 to motor 284. The return from motor 284 takes place through conductor 372, contact 1 of connector 332, wire 1 of cable Q, the terminal strip 366 and thence through conductor 374 to line 1 of the power supply. This causes the motor to run and to turn the pinion shaft through one revolution, as previously explained, at which time the dog again drops into the notch of the notched disc, thereby opening the motor switch 308 and stopping the motor and pinion, the pinion being geared to contact arm 276 in a 5 to 1 ratio. The full revolution of the pinion moves the sliding contact from segment 1 to segment 2 of the sequence relay. Thus the actual closing of the pill press causes a shift of the sequence relay from segment 1 to segment 2, and the significance of this movement of the sequence relay is that the pill press has actually closed to form pills.

After the pills are pressed, the pill press is opened and the pills are thereby ejected from the pill cavities into the apertures in the pill board. When the pills are thus ejected the ejection switch or lower switch 348 on the pill press is closed. At this time current flows from line 2 through conductors 376, 364, ejection switch 348, conductor 382, terminal strip 366, conductor 7 of cable Q, contact 7 of connector 332, and thence through conductor 384 to segment 2 of the sequence relay. Inasmuch as the contact arm is then on segment 2, the current flows to slip ring 278, and then thru conductor 370 to solenoid 306, from which the current returns by way of conductor 372 leading to contact 1 of connector 332, which, as has already been explained, corresponds to conductor 1 of cable Q and line 1 of the power supply. The energization of solenoid 306 releases the dog and closes motor switch 308, as was previously explained, and this energizes motor 284 to step the sequence relay ahead from segment 2 to segment 3, at which time the dog again locks the mechanism and the motor is stopped. Reverting to Figs. 15 through 17, it will be recollected that shaft 280 of sequence relay carries cams 316 and 318 for operating powder carrier switch 320 and powder measuring switch 322. When the relay reaches segment 3, the powder carrier switch 322 is closed, and this is preparatory to permitting movement of the powder carrier into the pill press. However, the pill board loaded with pills must first be moved out of the pill press. For purposes of the present disclosure, this movement may be performed manually. When the pill board has been moved out of the pill press, the manually operable switch 350 is closed, the function of this switch being to feed powder to the pill press; that is, to cause movement of the powder carrier from the powder measurer into the pill press. Closing of switch 350 moves the powder carrier up into the pill press and opening of switch 350 brings the powder carrier back to the powder measurer. Premature closing of switch 350 is guarded against by the rail switch 352, for unless and until the pill board is moved out of the pill press, the rail switch 352 remains open, thus making premature closing of switch 350 ineffective, the two switches being connected in series with one another.

Considering the circuit in greater detail, closing of switches 350 and 352 supplies power from line 2 through conductors 474 and 386 to terminal strip 366 and conductor 4 of cable "Q," which in turn leads to contact 4 of connector 332 and thence through conductor 388 to the powder carrier switch 320, which is at this time closed. The current flows from switch 320 through conductor 390, to contact 5 of connector 332, and thence through conductor 5 of cable "Q" to terminal strip 366 and thence through conductor 392 to the coil of relay R—11. The current returns through conductor 394 to line 1 of the power supply. The energization of relay R—11 changes the relay contacts from the position shown to opposite position, that is, the center blades 396 and 398 are moved from the left toward the right.

Current now flows from power supply line 2 through conductor 400, to blade 396, blade 402, conductor 404, limit switch arm 244, and conductor 406 to motor field coil 408. It will be observed that current flows up the field coil and thence flows through conductor 410, switch blade 412, blade 398, conductor 414, and up through the motor armature 416. The current returns through conductor 418 and conductor 394 to line 1 of the power supply. The powder carrier motor 188 is thus energized and is rotated in such a direction as to move the powder carrier into the pill press. As the powder carrier moves into the pill press, the cams 240 and 242 (Fig. 12) shift the switch arms 244 and 246. Specifically, switch arm 244 is first shifted to center contact 420, thereby inserting the resistor 342 in the motor circuit and decelerating the motor. As the extreme limit position is approached, the arm 244 leaves the contact 240 and this stops motor 188 by failure to supply any further power to the motor through conductor 406. At the same time the other, or lower limit switch arm 246 has shifted from the left hand position to the right hand position preparatory to retraction of the powder carrier. The limit switch arms 244 and 246 move at all times in opposite directions.

At the extreme limit of movement of the powder carrier into the pill press, the switch arm 244 reaches contact 422 and this functions to step the sequence relay ahead to the next segment. Specifically, current flows from power supply line 2 through conductor 400 to switch blade 396, blade 402, conductor 404, switch arm 244, contact 422, conductor 424, terminal strip 366 through conductor 8 of cable "Q," to contact 8 of connector 332. From contact 8 the current flows through conductor 426 to segment 3 of the sequence relay. The arm being on segment 3, current flows through slip ring 278 and conductor 370 to solenoid 306, thus energizing the solenoid and causing the sequence relay to step ahead from segment 3 to segment 4. Thus the completion of movement of the powder carrier into the pill press steps the sequence relay ahead from segment 3 to segment 4, and the significance of this movement of the sequence relay is that the desired feed of powder to the pill press has been safely accomplished. It may be remarked that powder carrier switch 320 remains closed during the movement from segment 3 to segment 4, the cam surface being long enough to keep switch 320 closed on segment 4, as well as on segment 3.

To return the powder carrier, the manual switch 350 is opened. This interrupts the circuit previously described; that is, it interrupts the supply of current from line 2 of the power supply to reversing relay R—11. The de-energization of the relay causes the contact blades 396 and 398 to move to the left hand position shown in the drawing. At this time, however, the limit switch arms 244 and 246 are in a position opposite that shown in the drawings. Current now flows from line 2 to conductor 400, to switch blade 396, blade 428, conductor 430, switch arm 246, contact 432, conductor 434 and conductor 410, to the motor field 408. It will be noted that at this time the current flows downwardly through the motor field, and thence through the conductor 436, switch blade 438, blade 398, and through conductor 414, to the motor armature 416. The current flows upwardly through the motor armature, as before, and returns through conductor 418 and conductor 394 to line 1 of the power supply. Motor 188 is thus energized but rotated in reverse direction, thereby withdrawing the powder carrier from the pill press. As the powder carrier approaches the powder measurer, the lower limit switch arm 246 moves to the center contact 440, thereby inserting resistor 344 in series with the motor circuit, and decelerating the motor. When the powder carrier has moved substantially to final position, the limit switch arm 246 leaves contact 440, thus discontinuing the supply of current to motor 188 and stopping the motor. In the meantime, the other switch arm 244 moves in opposite direction, or toward the right to the position shown in the drawings.

When the powder carrier reaches its limit of movement into the powder measurer, the switch arm 246 engages the contact 442 and this functions to move the sequence relay ahead from segment 4 to segment 5. Specifically, current flows from line 2 of the power supply through conductor 400 to switch blade 396, blade 428, conductor 430, switch arm 246, contact 442 and through conductor 444 to the terminal strip 366. The current then flows through conductor 9 of cable "Q," to contact 9 of connector 332, and thence through conductor 446, to segment 4 of sequence relay. The arm 276 being on segment 4, the current is transferred to slip ring 278, and thence through conductor 370, to solenoid 306. As before, the energization of solenoid 306 releases the locking dog of the sequence relay and closes the motor switch 308, thereby causing the sequence relay to step ahead from segment 4 to segment 5. During this movement the powder carrier switch 320 is opened, and the powder measuring switch 322 is closed. The movement of the sequence relay from segment 4 to segment 5 is caused by return of the powder carrier to the powder measurer, and the significance of this movement is that the powder carrier has reached its fully retracted position and is, therefore, in registration with the powder measuring cups and funnels preparatory to receiving a new charge of powder.

The next step in the operation of the apparatus is to measure and deliver the new supply of powder, and it is for this reason that the powder measuring switch 322 is closed when the sequence relay reaches segment 5. Current now flows from line 2 of the power supply through conductor 376 to terminal strip 366, and thence through conductor 2 of cable Q, to contact 2 of connector 332. From contact 2, the current flows through conductor 378 and conductor 448 to powder measuring switch 322, and thence through conductor 450, to contact 3 on connector 332. Current then flows through wire 3 of cable Q to terminal strip 366, which in turn is connected through conductor 452 to the coil 454 of relay R—12. The current returns through conductor 456 and conductor 374 to line 1 of the power supply.

The resulting energization of coil 454 causes relay R—12 to change its center contact 458 from right hand position shown to its left hand position. Current now flows from line 2 through conductor 376 and conductor 460 to switch blade 458, then through blade 462 to wire S2 of cable S. This leads to contact C2 of connector 336, which in turn leads through conductor 502 to finger F2 at the drum switch 142.

The nature of drum switch 142 may be explained with reference to the development 142' thereof. The drum is made of metal and has a continuous ridge D1 engaged by finger F1. It also has a ridge D2 extending half way around the drum, a ridge D3 extending about the opposite half of the drum, and a very short ridge, or contact D4 marking the transition from ridge D2 to ridge D3. The ridges D2, D3 and D4 are, of course, adapted to be engaged by the fingers F2, F3 and F4, respectively.

In general, current flowing to the metallic drum through any of the fingers F2, F3 and F4 is immediately conducted by the metallic drum to the continuous ridge, or slip ring D1, and thereby returned through finger F1.

Thus, in the present case, current flowing through finger F2 to ridge D2 returns through D1 and F1, to conductor 501, connector contact C1, and through conductor S1 to connector 340 and wire 464 to cam shaft motor 36. The current returns through conductor 466, connector 340, conductor 468, and wires 456 and 374 to line 1 of the power supply. The energization of the motor causes it to drive the cam shaft through the reduction gearing previously described. The movement of the cam shaft at this time closes the cut-off plates at the top of the measuring cups and opens the discharge valves at the bottom of the measuring cups, so that the measuring cups discharge their powder into the funnels.

Of course, the movement of the cam shaft is accompanied by rotation of the switch drum 142, its movement being as indicated by the arrow. This causes the ridge D2 to move past finger F2, and at the end of a half revolution finger F2 leaves ridge D2, thus de-energizing the cam shaft motor 36, and bringing the cam shaft to rest. However, just before finger F2 leaves ridge D2, the finger F4 reaches the ridge D4. This causes a momentary energization, or supply of current to finger F4 from line 2 (which is connected, as previously described, to finger F2). This current is used to cause the sequence relay to step ahead from segment 5 to segment 1. Current flows momentarily from line 2 to finger F4, then through conductor 504, to contact C4 of connector 336, and thence through wire S4 of cable S to terminal strip 366. Connection is there made to conductor 10 of cable Q, which in turn leads to contact 10 of connector 332, and the latter is connected through wire 468 to segment 5 of the sequence relay. Inasmuch as contact arm 276 is then at segment 5, current is transferred to slip ring 278, and through conductor 370 to solenoid 306 which, as before, releases the locking dog and closes the motor switch 308, thereby causing motor 284 to advance the sequence relay from segment 5 to segment 1.

Due to the time period required for the sequence relay to move from segment 5 to segment 1, this being, say, one second, there is ample time for the cam shaft of the powder measurer to come to rest, and in its resting position, the cut-off plates at the top of the powder cups are fully closed, and the valves at the bottom fully opened, thus affording ample opportunity for the powder cups to become completely emptied.

When the contact arm 276 of the sequence relay reaches segment 1, the powder measuring switch 322 is opened. The cam which operates this switch is so designed as to open the switch just before the sequence relay comes to rest on segment 1. Opening of the powder measuring switch 322 interrupts the supply of energy to relay 12, and the center switch blade 458 of the relay moves back to the right-hand position shown in the drawings. Current now flows from line 2 through conductors 376 and 460 to switch blade 458, then to blade 470, and conductor S3 of cable "S" to contact C3 of connector 336, from which current flows through conductor 503 to finger F3 and ridge D3 on the switch drum. The current then flows to ridge or slip ring D1, finger F1, conductor 501, contact C1 of connector 336, and thence to wire S1 of cable "S." This in turn leads through connector 340 and wire 464 to motor 36 from which the current returns by way of wire 466, connector 340, wire 468, wire 456 and wire 374 leading back to line 1 of the power supply. The cam shaft motor 36 is thus again energized, and the cam shaft is turned for another half revolution, at which time the ridge D3 of switch drum 142 runs from beneath the finger F3. The motor circuit is thus interrupted and the powder measurer then stops with the cut off plates is open condition, and the discharge valves in closed condition at the bottom of the measuring cup, or in other words, with the parts in the relation shown in Fig. 6 of the drawings. This measures the charges of powder which are later discharged through the funnel and into the pockets of the powder carrier.

To summarize, the five steps of the sequence relay correspond to the following five operations:
1. Closing of pill press to form pills.
2. Opening of pill press to eject pills into the pill board.
3. Movement of the pill board out of the pill press, and movement of the powder carrier into the pill press to reload the press with a fresh supply of powder.
4. Return of the powder carrier to the powder measurer to receive another charge of powder.
5. Measurement of powder and discharge of same into the powder carrier.

Closing of the pill press to form the pills, closes the upper limit switch and advances the sequence relay from segment 1 to segment 2. Opening of the pill press and ejection of the pills into the pill board closes the lower switch, or ejection switch, and this causes the sequence relay to step from segment 2 to segment 3. The movement of the sequence relay from 2 to 3 is preparatory to moving the pill board out of the pill press, just as movement from 1 to 2 was preparatory to recognition of ejection of the pills into the pill board. If sequence relay remains in position 1, it signifies that the pill press did not close, and if the relay remains in position 2, it signifies that although pills were formed, they were not yet ejected. In either case, it is imperative to avoid the delivery of another charge of powder to the pill press, for if the pills were made of double size and were then delivered to the molding press, the mold would probably be ruined.

The movement of sequence relay from position 3 to position 4 is caused by movement of the powder carrier into the pill press, and this in turn must, because of the rail switch 352, be preceded by movement of the pill board out of the pill press. Powder is discharged from the powder carrier into the mold cavities when the powder has moved all the way into the pill press, and the significance of movement of the sequence relay from position 3 to position 4 is that powder has been delivered to the pill cavities.

Movement of the sequence relay from position 4 to 5 is caused by return of the powder carrier fully into the powder measurer, where it is ready to receive a new charge of powder. Movement of the sequence relay from position 5 to position 1 takes place when the powder measurer has gone through half its cycle, that is, when the measuring cups have been emptied of powder into the powder carrier.

When the sequence relay reaches position 1, the second half of the powder measuring cycle takes place, that is, the refilling of the powder measuring cups. The sequence relay then remains in position 1 until the operator closes the pill press to form the previously delivered powder into pills.

It has already been mentioned that an automatic switch may be used instead of the manual switch 350 for initiating forward movement of the powder carrier. When this is done, it is also possible to eliminate the rail switch 352, and in such case both switches are replaced by a single automatically operated switch. This switch is indicated at 472 in Fig. 21. The conductors 386' and 474' correspond to the conductors 386 and 474 in Fig. 20. The mechanical nature of this switch may be better described with reference to Figs. 18 and 19 of the drawings. The switch comprises a movable switch blade 476 pivoted at 478 and movable over a stationary contact 480. A leaf spring member 482 extends from the switch arm 476 and is disposed in the path of a suitable operating lug or pin 484 mounted on the pill board. During movement of the pill board from the pill press to the molding press, as shown in Fig. 18, the pin 484 bears against spring 482 and moves the switch from open to closed position. Its movement is limited by stop 486. Nevertheless, the pin 484 may ride past spring 482 because of the yieldable nature of the spring, it bending to position 482'. After pin 484 completely passes the switch, the spring returns from the position 482' to position 482 where it is located in the path of operating pin 484 when the pill board returns from the molding press to the pill press. The operation at that time is as indicated in Fig. 19, the pin 484 bearing against the spring 482 and moving the switch 476 from the closed position of Fig. 18 to the open position of Fig. 19. The movement of switch 476 is limited by stop 488 and the continued movement of pin 484 flexes spring 482, from the solid line position to the broken line position 482'. When pin 484 moves entirely past the switch, the spring returns to the solid line position 482 where it is adapted to intercept pin 484 during the next movement of the pill board.

This switch preferably does not function the instant the pill board begins to leave the pill press, but preferably functions about half way along the track, thus making it impossible for the pill board and powder carrier to collide. Thus, referring to Fig. 2 the switch 472 is so located that it is operated by the pin 484 on pill board E after the pill board has moved out of the pill press, and preferably at or about the end of the first stage of the two stage movement of the pill board to the molding press.

*Summary*

It is believed that the construction and operation, as well as the many advantages of my improved molding apparatus will be apparent from the foregoing detailed description thereof. Powder is supplied as needed through conveyor H (Fig. 2) to the hopper of the powder measurer and is delivered from the hopper downwardly through level determining pipes 14 (Fig. 3) to the powder box 16. The powder is measured in cups 18 (Fig. 7), these cups being provided with cut off plates 20 thereabove and discharge valves 22 therebelow. Plates 20 are elevated to avoid rubbing the powder. The valves open and close alternately thereby measuring and discharging the desired quantities of powder. The amount of powder measured in any one cup is accurately adjustable by means of regulator screw 30. The powder when discharged is received in funnel 24 and delivered to pocket 26 of the powder carrier 28. All surfaces are steeper than the angle of repose of the powder.

The entire powder box with the measuring cups may be elevated by lift handle 32 (Fig. 1), when the regulator screws 30 are to be changed.

When pill press B is closed, the pill board E is in the pill press (Fig. 23). Catch board F is between the pill press and the molding press C. When pill press B opens the ejector cylinder 490 (Fig. 23) raises the ejector plugs 178 (Fig. 22) thereby ejecting the pills into the pill board E, the apertures of which are provided with springs 492 to hold the pills. The molding press opens partially by lowering of movable lower head 494 (Fig. 23) and the assembly of pill board E and catch board F is moved one stage, thereby bringing catch board F into the molding press C and bringing pill board E out of pill press B. During this movement, the pill board trips rail switch 472 (Fig. 2) thereby initiating movement of the powder carrier into the pill press. On reaching the pill press, the powder is discharged from the powder carrier into the mold cavities as is indicated in Fig. 8. The molding press C continues to open and the previously molded pieces are stripped therefrom and fall onto the catch board F. The assembly of pill board and catch board is then moved from its second stage of movement, thus bringing the loaded catch board onto down-turned ends G (Fig. 2) of the rails, thereby dumping the molded pieces. At the same time the pill board is moved into the molding press and when moved fully into position, the pills are in registration with the cavities 496 (Fig. 1) of the mold, and a suitable stop shifts the laminations of the pill board in such a manner as to release the grip of springs 492 on the pills, which consequently fall into the mold cavities.

The pill board and catch board assembly is now moved back through the molding press to the pill press. During this movement the pill board trips rail switch 472, thereby causing retraction of the powder carrier from the pill press B to the powder measurer A. The pill board is positively stopped when in registration with the pill press, and similarly the powder carrier is positively stopped when in registration with the powder measurer. The retraction of the powder carrier initiates operation of the cam shaft of the powder measurer, which then goes through its measuring cycle and reloads the powder carrier. At the same time the pill press and molding press are again closed, thus preforming the preceding charge of powder into pills, and molding the earlier formed pills into finished articles.

The presses may be controlled by manually operated valves; and the valves may, if desired, be interconnected to reduce the number of valves to be moved by the operator, or the valves may be automatically operated by motor driven timing mechanism, such as is disclosed in my co-pending application, Serial No. 239,933, filed November 12, 1938, and entitled "Automatic valve control for hydraulic press." It will also be understood that instead of moving the pill board and catch board assembly along the rails by hand the movement may be facilitated by the use of mechanism such as the sprocket chain arrangement disclosed in my co-pending application, Serial No. 239,934, previously referred to. Furthermore, the movement may be obtained under power, and all of the movements of the apparatus including the operation of the controlling valves for the presses may be interconnected for full automatic control in the manner disclosed in my co-pending application, Serial No. 307,268, filed December 2, 1939.

The present apparatus provides rapid, automatic and accurate measurement of the powder used in the pills. The pill cavity in the pill press may be deep, so that the powder will be well below the top of the cavity, so that the plunger enters part-way into the cavity before beginning to compress the powder. The amount of powder supplied for each pill is individually and independently regulatable, and this determines the amount of material in the pill that is supplied to the particular corresponding cavity of the mold in the molding press. Thus the pills are "custom made" for the mold cavities, and this compensates for non-uniformity in the mold cavities. Difficulties heretofore arising by reason of some pills being too small for an oversized mold cavity, or others being too large for an undersized mold cavity, are fully overcome. There is a minimum of defective pieces, and a minimum of flash or fin with consequent finishing labor on the molded pieces. The molding material is heated in the pill press and is partially reacted or cured. This greatly reduces the necessary curing in the molding press and speeds up the complete molding cycle. No danger arises from partial cure of the pills, because the heated pills are transferred directly into the molding press. In effect, the apparatus provides two stage molding, the powder being molded under heat and pressure into preforms which are then transferred to the molding press for finished molding.

Although the drawing illustrates a mold having a number of cavities corresponding to the pills, it will be understood that the mold may have a lesser number of larger cavities, and that a plurality of pills may be supplied to different appropriate parts of a single mold cavity.

It is important to understand that while the heating of the pills generates fumes, these fumes are permitted to escape freely during the passage of the pills from the pill press to the molding press. As a result, the final molded product has a compactness and strength much greater than that of a product which is heated solely in the pill press, for then there is no such excellent opportunity for escape of fumes.

In some special cases it is not feasible to use pills. One example is the base for a cup for an athletic award, because of its shape. Another example is because of the molding material, say cellulose acetate. Another example is because of the adverse effect of certain coloring materials on the pills. In such special cases the apparatus may be modified to eliminate the pill press, the measured powder being transferred all the way from the measurer to the molding press.

It will be understood that while the sequence relay has been described as having only five steps, it may be designed to operate with a larger number of steps, thereby providing safety interlock in respect to a greater number of steps in the operation of the complete apparatus. For example, extra contacts might be inserted at appropriate points for the return of the pill press to its position of repose or open position; or the physical closing of the pill board by relative movement of the laminations; or the return of the ejector pins to their position of repose or bottom-most position in the pill cavities.

It will also be understood that while the steps in the sequence relay have been illustrated as being equal, this is not necessarily the case, and I have also employed a sequence relay in which the time available for the powder measuring operation was greatly increased by lengthening the distance between contact 5 and contact 1. More specifically, a ten-segment disc like that heretofore described was employed, but the first five contacts on the sequence relay were each used as electrical contacts (instead of using only the alternate contacts as heretofore described), and the entire second half of the disc was used as spacing between contacts 5 and 1. These five contacts, that is, contacts 6 through 10, are preferably connected together and to line 2. Contact 5 is only momentarily energized, as before, while contacts 6 through 10 are continuously energized. Notched disc 294 is provided with two diametrically opposed notches (instead of only a single notch), so that it is stopped every half revolution. In this way the contact arm of the sequence relay is moved only one-tenth of a revolution for each step, instead of one-fifth. The movement over contacts 6 through 10 is continuous, the pawl being held out continuously. Cams 316 and 318 are changed accordingly to permit the exact sequence of operations, as previously described.

It will therefore be apparent that while I have shown and described my invention in a preferred form, many changes and modifications may be made in the structure disclosed, without departing from the spirit of the invention defined in the following claims.

I claim:

1. Apparatus of the class described comprising a powder measurer having a plurality of rows of powder measuring devices, the devices in each row and the rows being disposed closely adjacent one another and arranged to measure the powder by volume, means associated with each of said devices for individual independent adjustment of the volume of powder measured thereby, said means being compact in horizontal dimension, a press having a plurality of rows of cavities, each of said cavities corresponding to one of the powder measuring devices, and means to transfer the powder measured by said devices to their mating cavities.

2. Apparatus of the class described comprising a powder measurer having a plurality of rows of powder measuring devices, the devices in each row and the rows being disposed closely adjacent one another and arranged to measure the powder by volume, means associated with each of said devices for individual independent adjustment of the volume of powder measured thereby, said means being compact in horizontal dimension, a press having a plurality of rows of cavities, each of said cavities corresponding to one of the powder measuring devices, and a powder carrier movable between the powder measurer and the press, said powder carrier having a plurality of rows of pockets functioning to simultaneously transfer the powder measured by said devices to their mating cavities.

3. Apparatus for making pills out of powdered thermosetting molding material, said apparatus comprising a powder measurer having a powder box, a plurality of rows of powder measuring devices disposed closely adjacent one another at the bottom of the powder box and arranged to measure the powder by bulk, means associated with each of said devices for individual independent adjustment of the amount of powder measured thereby, a vibrator attached to the powder box for vibrating the box and measuring devices, a pill press having a plurality of rows of pill cavities, each of said pill cavities corresponding to one of the powder measuring devices, and a powder carrier movable between the powder measurer and the press to transfer the powder measured by said devices to their mating cavities.

4. Apparatus of the class described comprising a powder measurer having a plurality of rows of powder measuring cups, the devices in each row and the rows being disposed closely adjacent one another and arranged to measure the powder by volume, a regulator which is compact in horizontal dimension associated with each of said cups for individual independent adjustment of the volume of powder measured thereby, a pill press having a plurality of rows of pill forming cavities, each of said cavities corresponding to one of the powder measuring cups, guides connecting the powder measurer with the pill press, and a powder carrier movable on said guides between the powder measurer and the pill press, said powder carrier having a plurality of rows of pockets adapted to register with the powder measuring cups and with the pill cavities and functioning to transfer the powder measured by said cups to their mating cavities.

5. Apparatus of the class described comprising a stationary powder measurer, a stationary preform press, a stationary molding press, stationary guides interconnecting the powder measurer, the preform press, and the molding press, a powder carrier movable on said guides between the powder measurer and the preform press for transferring the measured powder to the preform press, and a pill board movable along said guides between the preform press and the molding press for transferring the preform to the molding press.

6. Apparatus of the class described comprising a powder measurer having a plurality of powder measuring devices, a preform press having a plurality of pill forming cavities, each of said cavities corresponding to one of the powder measuring devices, a molding press, a powder carrier movable between the powder measurer and the preform press for transferring the measured powder from the measuring devices to the corresponding preform cavities, and a pill board movable between the preform press and the molding press for transferring the preforms from the preform press to desired points in the molding press.

7. Apparatus of the class described comprising a powder measurer having a plurality of powder measuring devices, means associated with each of said devices for individual independent adjustment of the amount of powder measured thereby, a pill press having a plurality of pill forming cavities, each of said cavities corresponding to one of the powder measuring devices, a molding press, guides interconnecting the powder measurer, the pill press, and the molding press, a powder carrier movable on said guides between the powder measurer and the pill press, said powder carrier having a plurality of pockets for transferring the measured powder from the measuring devices to the corresponding pill press cavities, and a pill board movable along said guides between the pill press and the molding press for transferring the pills from the pill press to desired points in the molding press.

8. Apparatus of the class described comprising a powder measurer having a plurality of powder measuring cups, a regulator associated with each of said cups for individual independent adjustment of the amount of powder measured thereby, a pill press having a plurality of pill forming cavities, each of said cavities corresponding to one of the powder measuring cups, a molding press having a plurality of mold cavities each corresponding to one of the pill cavities, a powder carrier movable between the powder measurer and the pill press, said powder carrier having a plurality of pockets adapted to register with the measuring cups and with the pill cavities for transferring the measured powder from the measuring devices to the corresponding pill press cavities, and a pill board movable between the pill press and the molding press, said pill board having a plurality of apertures adapted to register with the pill cavities and with the mold cavities for transferring the pills from the pill press cavities to the corresponding molding press cavities.

9. Apparatus of the class described comprising a powder measurer, a preform press, a molding press, a powder carrier movable between the powder measurer and the preform press, a pill board movable between the preform press and the molding press, and means to prevent the powder carrier from moving into the preform press until after the pill board has moved out of the preform press.

10. Apparatus of the class described comprising a powder measurer having a plurality of powder measuring devices, a preform press having a plurality of cavities, each of said cavities corresponding to one of the powder measuring devices, a molding press, a powder carrier movable between the powder measurer and the preform press, said powder carrier having a plurality of pockets for transferring the measured powder from the measuring devices to the corresponding preform cavities, a pill board movable between the preform press and the molding press for transferring the preforms to desired points in the molding press, and means whereby the powder carrier is moved from the measurer to the preform press after the pill board has moved out of the preform press toward the molding press, and whereby said powder carrier is moved out of the preform press toward the measurer before the pill board is moved back into the preform press.

11. Apparatus of the class described comprising a powder measurer having a plurality of powder measuring devices, means associated with each of said devices for individual independent adjustment of the amount of powder measured thereby, pill press having a plurality of pill forming cavities, each of said cavities corresponding to one of the powder measuring devices, a molding press, guides interconnecting the powder measurer, the pill press, and the molding press, a powder carrier movable on said guides between the powder measurer and the pill press, said powder carrier having a plurality of pockets for transferring the measured powder from the measuring devices to the corresponding pill press cavities, a pill board movable along said guides between the pill press and the molding press for transferring the pills from the pill press to desired points in the molding press, and means whereby the powder carrier is moved from the measurer to the pill press after the pill board has moved out of the pill press toward the molding press, and whereby said powder carrier is moved back to the measurer from the pill press before the pill board is moved back into the pill press.

12. Apparatus of the class described comprising a powder measurer having a plurality of powder measuring cups, a regulator associated with each of said cups for individual independent adjustment of the amount of powder measured thereby, a pill press having a plurality of pill forming cavities, each of said cavities corresponding to one of the powder measuring cups, a molding press having a plurality of mold cavities each corresponding to one of the pill cavities, a powder carrier movable between the powder measurer and the pill press, said powder carrier having a plurality of pockets adapted to register with the measuring cups and with the pill cavities for transferring the measured powder from the measurer to the pill press, a pill board movable between the pill press and the molding press, said pill board having a plurality of apertures adapted to register with the pill cavities and with the mold cavities for transferring the pills from the pill press to the molding press, and means to prevent the powder carrier from moving into the pill press until after the previously formed pills have been ejected into the pill board and moved out of the pill press by the pill board.

13. A molding-powder measuring apparatus intended to be used with a powder-transfer means and a press having a plurality of cavities, said apparatus comprising a powder box, a plurality of closely adjacent bulk measuring cups depending from the bottom of the powder box, said measuring cups corresponding respectively to the cavities of the press with which the measuring apparatus is to be used, and cut-off plates movable along the bottom of said powder box to a position over said measuring cups, said plates being spaced slightly above the bottom of the powder box to prevent rubbing of molding powder therebetween hard enough to react the molding powder.

14. A molding-powder measuring apparatus intended to be used with a powder-transfer means and a press having a plurality of rows of cavities, said apparatus comprising a powder box, a plurality of rows of bulk measuring cups at the bottom of the powder box, the devices in each row and the rows being closely adjacent one another, said measuring cups corresponding respectively to the cavities of the press with which the measuring apparatus is to be used, cut-off means over said measuring cups, discharge valves at the bottom of the measuring cups, said cut-off means and valves being substantially devoid of tightly pressed sliding surfaces between which molding powder would be rubbed by their operation hard enough to react, and separate regulator means which is compact in horizontal dimension for independently adjusting the volume of each measuring cup.

15. In apparatus of the class described, intended for use with a press having a plurality of rows of cavities, said apparatus comprising a powder box for molding powder, a plurality of rows of bulk measuring cups at the bottom of the powder box for measuring the powder by volume, the devices in each row and the rows being closely adjacent one another, said measuring cups corresponding respectively to the cavities of the press with which the apparatus is to be used, cut-off means over said measuring cups, discharge valves at the bottom of the measuring cups, said cut-off means and valves being substantially devoid of tightly pressed sliding surfaces between which molding powder would be rubbed by their operation hard enough to react, upright passages beneath the measuring cups, and a powder carrier movable between a position beneath the upright passages and a position outside the apparatus for delivering the powder to the press, said powder carrier having a plurality of rows of pockets registering with the upright passages, pivot means for emptying each of the pockets whereby said pockets also are substantially devoid of sliding surfaces, and means for simultaneously operating all of said pivot means to discharge the powder from the pockets.

16. A molding-powder measuring apparatus intended to be used with a powder-transfer means and a press having a plurality of cavities, said apparatus comprising a powder box, a plurality of closely adjacent bulk measuring cups at the bottom of the powder box, said measuring cups corresponding respectively to the cavities of the press with which the measuring apparatus is to be used, cut-off means over said measuring cups, discharge valves at the bottom of the measuring cups, a regulator screw for independently adjusting the volume of each of the measuring cups, funnels beneath the measuring cups, and lift means to lift the powder box and with it the measuring cups and regulator screws, for easy access to the regulator screws when adjusting the same.

17. A molding-powder measuring apparatus intended to be used with a powder-transfer means and a press having a plurality of cavities, said apparatus comprising a hopper, a powder box beneath the hopper, level determining pipes descending from the hopper to the powder box, a plurality of closely adjacent bulk measuring cups at the bottom of the powder box, said measuring cups corresponding respectively to the cavities of the press with which the measuring apparatus is to be used, cut-off plates movable over said measuring cups, said plates being spaced slightly above the bottom of the powder box, discharge valves at the bottom of the measuring cups, and a regulator screw for independently adjusting the volume of each of the measuring cups.

18. In apparatus of the class described, intended for use with a press having a plurality of cavities, said apparatus comprising a hopper for molding powder, a powder box beneath the hopper, level-determining pipes descending from the hopper to the powder box, a plurality of closely adjacent bulk measuring cups at the bottom of the powder box, said measuring cups corresponding respectively to the cavities of the press with which the apparatus is to be used, cut-off plates movable over said measuring cups, said plates being spaced slightly above the bottom of the powder box, discharge valves at the bottom of the measuring cups, a regulator screw for independently adjusting the volume of each of the measuring cups, upright passages beneath the measuring cups, a powder carrier movable between a position beneath the upright passages and a position outside the apparatus for delivering the powder to the press, said powder carrier having a plurality of pockets registering with the upright passages, and means for simultaneously discharging the powder from all of the pockets.

19. In apparatus of the class described, a pill press, a powder carrier, a motor for moving said powder carrier into the pill press, means to decelerate the powder carrier as it reaches the end of its movement into the pill press, and means for stopping the drive of the powder carrier when it has moved all the way into the pill press.

20. In apparatus of the class described, a pill press, a powder carrier, a motor for moving said powder carrier into the pill press, a resistor, means to connect the resistor in the motor circuit when the powder carrier approaches the end of its travel in order to decelerate the powder carrier, and a limit switch for stopping the motor when the powder carrier has moved into the pill press.

21. In apparatus of the class described, a multiple cavity pill press having a plurality of rows of cavities, said cavities in each row and said rows being closely adjacent one another, a powder carrier having a plurality of rows of powder pockets, said pockets in each row and said rows being closely adjacent one another and registering with said cavities, pivot means at each of said pockets for emptying the same, whereby said pockets are substantially devoid of sliding surfaces, and trip means for automatically operating all of the said pivot means and thereby emptying said powder pockets when the powder carrier moves into the pill press.

22. In apparatus of the class described, a multiple cavity pill press, a powder carrier having a plurality of powder pockets, pivot means at each of said pockets for emptying the same, a motor for moving said powder carrier into the pill press, means to decelerate the powder carrier as it reaches the end of its movement into the pill press, trip means for automatically operating all of the said pivot means and thereby emptying said powder pockets when the powder carrier has moved into the pill press, and means for stopping the powder carrier when it has moved all the way into the pill press.

23. In apparatus of the class described, a multiple cavity pill press, a powder carrier having a plurality of powder pockets, closures at the bottom of said pockets, means for automatically opening all of the closures when the powder carrier moves into the pill press, a motor for moving said powder carrier into the pill press, a resistor, means to connect the resistor in the motor circuit when the powder carrier approaches the end of its travel, adjustable means for determining the point at which the resistor is connected in circuit, and a limit switch for stopping the motor when the powder carrier has moved into the pill press.

24. In apparatus of the class described, a powder measurer, a pill press, a molding press, a powder carrier movable between the powder measurer and the pill press, a pill board movable between the pill press and the molding press, a reversible motor for moving the powder carrier, a switch arranged to be operated by the pill board as it moves between the pill press and the molding press, said switch being so connected in the motor control circuit that the powder carrier is moved into the pill press when the pill board moves out of the pill press, and the powder carrier is moved out of the pill press when the pill board moves into the pill press.

25. In apparatus of the class described, a powder measurer, a pill press, a molding press, rails connecting the powder measurer, the pill press, and the molding press, a powder carrier movable between the powder measurer and the pill press, a pill board movable between the pill press and the molding press, a reversible motor for moving the powder carrier, a rail switch arranged to be operated by the pill board as it moves between the pill press and the molding press, said rail switch being so connected in the motor circuit that the powder carrier is moved into the pill press when the pill board moves out of the pill press, and the powder carrier is moved out of the pill press when the pill board moves into the pill press, and motion limit switches connected in the motor circuit for stopping the motor when the powder carrier has moved into the pill press or has moved into the powder measurer.

26. In apparatus of the class described a powder measurer, a pill press, a molding press, a powder carrier movable between the powder measurer and the pill press, a pill board movable between the pill press and the molding press, a motor for moving the powder carrier, a switch on said pill press operated in response to closing of the pill press, another switch on said pill press operated in response to ejection of pills from the pill press into the pill board, and a switch operated by the pill board as it moves from the pill press to the molding press, all of said switches being so connected in the motor control circuit that the powder carrier cannot move into the pill press until after the pills have been pressed and ejected into the pill board and moved out of the pill press.

27. In apparatus of the class described, a powder measurer, a motor for driving the same, a pill press, a powder carrier movable between the powder measurer and the pill press, a motor for operating said powder carrier, and means responsive to movement of the powder carrier for controlling the motor of the powder measurer and thereby causing the powder measurer to perform its measuring operation, and to discharge the measured powder into the powder carrier, in proper timed relation.

28. In apparatus of the class described a powder measurer, a pill press, a molding press, a powder carrier movable between the powder measurer and the pill press, a pill board movable between the pill press and the molding press, means operated by movement of the pill board from the pill press to the molding press for causing the powder carrier to move into the pill press, and means responsive to movement of the powder carrier into the powder measurer for causing the powder measurer to perform its measuring operation.

29. In apparatus of the class described a powder measurer, a pill press, means to close the same, means to eject pills made thereby, a molding press, a powder carrier movable between the powder measurer and the pill press, a pill board movable between the pill press and the molding press, a sequence relay having a series of steps, said relay being moved a step in response to closing of the pill press, another step in response to ejection of the pills from the pill press into the pill board, another step in response to movement of the pill board from the pill press to the molding press, another step in response to retraction of the powder carrier into the powder measurer, and another step in response to movement of a new charge of powder for the powder carrier, and interconnecting means whereby no succeeding operation can take place until the sequence relay reaches that step which indicates that all preceding operations have already taken place.

30. A molding-powder measuring apparatus intended to be used with a powder-transfer means and a press having a plurality of cavities, said apparatus comprising a powder box, a plurality of measuring cups at the bottom of the powder box, said measuring cups corresponding respectively to the cavities of the press with which the measuring apparatus is to be used, cut-off means over said measuring cups, and discharge valves at the bottom of the measuring cups, said cut-off means and valves being substantially devoid of sliding surfaces between which molding powder would be rubbed by their operation, the surfaces of said cups and the closure surfaces of said valves being either vertical or disposed at an angle steeper than the angle of repose of the molding powder.

31. A molding-powder measuring apparatus intended to be used with a powder-transfer means and a press having a plurality of cavities, said apparatus comprising a powder box, a plurality of closely adjacent bulk measuring cups at the bottom of the powder box, said measuring cups corresponding respectively to the cavities of the press with which the measuring apparatus is to be used, cut-off means over said measuring cups, discharge valves at the bottom of the measuring cups, said cut-off means and valves being substantially devoid of sliding surfaces between which molding powder would be rubbed by their operation, and volume regulators for each of the measuring cups, the surfaces of said cups and the closure surfaces of said valves being either vertical or disposed at an angle steeper than the angle of repose of the molding powder.

32. Apparatus of the class described, comprising a powder measurer, a preform press, a molding press, a powder carrier movable between the powder measurer and the preform press, an electric motor for moving said powder carrier, a pillboard movable between the preform press and the molding press, and a switch responsive to movement of the pillboard to cause energization of the aforesaid motor after the pillboard has started to move out of the pill press, and thereby causing the powder carrier to move into the pill press.

33. In apparatus of the class described, a powder measurer, a motor for driving the same, a pill press, means to close the same, means to eject pills made thereby, a powder carrier movable between the powder measurer and the pill press, a sequence relay having a series of steps, a closed limit switch on the pill press for moving the relay one step in response to closing of the pill press, an ejector switch on the pill press for moving the relay another step in response to ejection of the pills from the pill press, a switch responsive to outward movement of the powder carrier for moving the relay another step when the powder carrier is moved from the powder measurer to the pill press, a switch responsive to return movement of the powder carrier to move the relay another step in response to return of the powder carrier into the powder measurer, and a switch for controlling the operation of the motor driving the powder measurer, said switch being controlled by said relay, whereby the powder measurer is automatically operated to discharge powder into the powder carrier when the preceding operations have taken place.

34. A molding-powder measuring apparatus intended to be used with a powder transfer means and a press having a plurality of cavities, said apparatus comprising a powder box, a plurality of closely adjacent bulk measuring cups depending from the bottom of the powder box for measuring the powder by volume, said measuring cups corresponding respectively to the cavities of the press with which the measuring apparatus is to be used, cut-off plates movable along the bottom of said powder box to a position over said measuring cups, and discharge valves at the bottom of the measuring cups, said cut-off plates and discharge valves being so related to the measuring cups as to be substantially devoid of tightly pressed sliding surfaces between which molding powder would be rubbed hard enough to cause reaction of the molding powder.

35. A molding-powder measuring apparatus intended to be used with a powder-transfer means and a press having a plurality of supposedly uniform cavities, said apparatus comprising a powder box, a plurality of rows of bulk measuring cups at the bottom of the powder box for measuring the powder by volume, the devices in each row and the rows being closely adjacent one another, said measuring cups corresponding respectively to the cavities of the press with which the measuring apparatus is to be used, cut-off means over said measuring cups, discharge valves at the bottom of the measuring cups, and separate volume regulators which are compact in horizontal direction for independently adjusting the individual volumetric capacity of each of the measuring cups.

36. In apparatus of the class described, a powder measurer, a pill press, a powder carrier movable between the powder measurer and the pill press, an electric motor for moving said powder carrier, and means to decelerate the movement of the powder carrier as it reaches the end of its movement into either the pill press or the powder measurer, and limit switches for stopping the motor driving the powder carrier when the powder carrier has moved all the way into either the pill press or the powder measurer.

GORDON B. SAYRE.